(12) United States Patent
Rublee et al.

(10) Patent No.: US 10,081,106 B2
(45) Date of Patent: Sep. 25, 2018

(54) SAFETY SYSTEM FOR INTEGRATED HUMAN/ROBOTIC ENVIRONMENTS

(71) Applicant: X Development LLC

(72) Inventors: Ethan Rublee, Mountain View, CA (US); John Zevenbergen, Saratoga, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 323 days.

(21) Appl. No.: 14/951,479

(22) Filed: Nov. 24, 2015

(65) Prior Publication Data

US 2017/0144307 A1    May 25, 2017

(51) Int. Cl.
  *B25J 9/16*     (2006.01)
  *B25J 19/02*    (2006.01)
  *G05D 1/02*     (2006.01)

(52) U.S. Cl.
  CPC ........... *B25J 9/1676* (2013.01); *B25J 9/1694* (2013.01); *B25J 19/02* (2013.01); *B25J 19/021* (2013.01); *G05D 1/0289* (2013.01); *G05B 2219/40202* (2013.01); *G05D 2201/0216* (2013.01); *Y10S 901/09* (2013.01)

(58) Field of Classification Search
  None
  See application file for complete search history.

(56) References Cited

U.S. PATENT DOCUMENTS

| | | | |
|---|---|---|---|
| 7,761,184 B2 | 7/2010 | Moridaira et al. | |
| 7,888,825 B2 | 2/2011 | Iida et al. | |
| 8,249,747 B2* | 8/2012 | Kock | B25J 9/1676 318/568.11 |
| 8,706,297 B2 | 4/2014 | Letsky | |

(Continued)

FOREIGN PATENT DOCUMENTS

| | | |
|---|---|---|
| JP | 2004306247 A | 11/2004 |
| JP | 2011175393 A | 9/2011 |
| WO | 2013176762 A1 | 11/2013 |

OTHER PUBLICATIONS

International Searching Authority, International Search Report and Written Opinion for PCT/US2016/055220 dated Dec. 8, 2016.

(Continued)

*Primary Examiner* — Pho M Luu
(74) *Attorney, Agent, or Firm* — Middleton Reutlinger

(57) ABSTRACT

Systems and methods are provided for specifying safety rules for robotic devices. A computing device can determine information about any actors present within a predetermined area of an environment. The computing device can determine a safety classification for the predetermined area based on the information. The safety classification can include: a low safety classification if the information indicates zero actors are present within the predetermined area, a medium safety classification if the information indicates any actors are present within the predetermined area all are of a predetermined first type, and a high safety classification if the information indicates at least one actor present within the (Continued)

predetermined area is of a predetermined second type. After determining the safety classification for the predetermined area, the computing device can provide a safety rule for operating within the predetermined area to a robotic device operating in the environment.

22 Claims, 15 Drawing Sheets

(56) References Cited

U.S. PATENT DOCUMENTS

| | | | |
|---|---|---|---|
| 9,174,342 | B2 | 3/2015 | Pinter et al. |
| 9,019,104 | B2 | 4/2015 | Johnson et al. |
| 9,031,892 | B2* | 5/2015 | Martin ............... G06N 5/02 706/47 |
| 9,333,652 | B2* | 5/2016 | Hu ................... G06K 9/00355 |
| 2007/0198128 | A1 | 8/2007 | Ziegler et al. |
| 2012/0044074 | A1 | 2/2012 | Mulla |
| 2013/0282641 | A1 | 10/2013 | Martin et al. |
| 2017/0100838 | A1* | 4/2017 | Lewis ............... B25J 9/1676 |

OTHER PUBLICATIONS

S. Augusstsson, "Human and robot interaction based on safety zones in a shared work environment", Jun. 19, 2013, Master's Degree Report, University West, Department of Engineering Science, Trollhattan, Sweden, available via the Internet at www.diva-portal.org/smash/get/diva2:649402/FULLTEXT01.pdf (last visited Nov. 25, 2015).

Ekahau, Inc., "The Ekahau Real-Time Location System", Apr. 21, 2015, available via the Internet at www.ekahau.com/userData/ekahau/documents/solution-brochures/Ekahau-RFID-over-WiFi-RTLS-Solutions.pdf (last visited Jul. 18, 2015).

Ekahau, Inc., "Ekahau Vision—Location Analytics Platform", Jan. 31, 2015, available via the Internet at www.ekahau.com/userData/ekahau/documents/solution-brochures/Ekahau_RTLS_Vision_BR.pdf (last visited Nov. 25, 2015).

Ekahau, Inc., "Ekahau B4—Wi-Fi Badge Tag for Real Time Locating", Apr. 21, 2015, available via the Internet at www.ekahau.com/userData/ekahau/documents/datasheets/Ekahau_RTLS_B4_DS.pdf (last visited Nov. 25, 2015).

S. S. Ge et al., "Dynamic Motion Planning for Mobile Robots Using Potential Field Method", Proceedings of the 8th IEEE Mediterranean Conference on Control and Automation, Jul. 17, 2000, available via the Internet at citeseerx.ist.psu.edu/viewdoc/download?doi=10.1.1.97.4526&rep=rep1&type=pdf (last visited Nov. 25, 2015).

National Robotics Engineering Center, "Hybrid Safety System (HSS) Description", Jul. 19, 2015, available via the Internet at www.nrec.ri.cmu.edu/projects/hss/description/ (last visited Nov. 25, 2015).

RFID Journal LLC, "From how far away can a typical RFID tag be read?", May 23, 2013, available via the Internet at www.rfidjournal.com/faq/show?139 (last visited Nov. 25, 2015).

C. Swedberg, "Aerospace Company Tests RFID Solution for Tracking Cell Phones", Sep. 18, 2013, available via the Internet at www.rfidjournal.com/articles/pdf?11002 (last visited Nov. 25, 2015).

* cited by examiner

┌─────────────────────────────────────────────────────────────────────┐
│ 710 Determine presence information and actor type information about any |
│ actors present within a predetermined area of an environment using one |
│ or more sensors associated with a computing device |
└─────────────────────────────────────────────────────────────────────┘
                                    ▼
┌─────────────────────────────────────────────────────────────────────┐
│ 720 Determine a particular safety classification of the predetermined area |
│ based on at least the presence and actor type information using the |
│ computing device, where the particular safety classification includes: |
│ • a low safety classification if the presence and actor type information |
│   indicates zero actors are present within the predetermined area, |
│ • a medium safety classification if the presence and actor type |
│   information indicates one or more actors are present within the |
│   predetermined area and that all of the one or more actors are of a |
│   predetermined first type, and |
│ • a high safety classification if the presence and actor type information |
│   indicates one or more actors are present within the predetermined |
│   area and that at least one actor of the one or more actors is of a |
│   predetermined second type |
└─────────────────────────────────────────────────────────────────────┘
                                    ▼
┌─────────────────────────────────────────────────────────────────────┐
│ 730 After determining the particular safety classification for the |
│ predetermined area, the computing device providing a safety rule for |
│ operating within the predetermined area to a robotic device operating in |
│ the environment, where the safety rule corresponds to the particular |
│ safety classification |
└─────────────────────────────────────────────────────────────────────┘

FIG. 7

SAFETY SYSTEM FOR INTEGRATED HUMAN/ROBOTIC ENVIRONMENTS

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

SUMMARY

In one aspect, a method is provided. A computing device determines presence information and actor type information about any actors present within a predetermined area of an environment using one or more associated sensors. The computing device determines a particular safety classification of the predetermined area based on at least the presence and actor type information using the computing device, where the particular safety classification includes: a low safety classification if the presence and actor type information indicates zero actors are present within the predetermined area, a medium safety classification if the presence and actor type information indicates one or more actors are present within the predetermined area and that all of the one or more actors are of a predetermined first type, and a high safety classification if the presence and actor type information indicates one or more actors are present within the predetermined area and that at least one actor of the one or more actors is of a predetermined second type. After determining the particular safety classification for the predetermined area, the computing device provides a safety rule for operating within the predetermined area to a robotic device operating in the environment, where the safety rule corresponds to the particular safety classification In another aspect, a safety system is provided. The safety system includes a computing device. The computing device includes one or more processors and data storage. The data storage includes at least computer-executable instructions stored thereon that, when executed by the one or more processors, cause the computing device to perform functions. The functions include: determining presence information and actor type information about any actors present within a predetermined area of an environment using one or more sensors; determining a particular safety classification of the predetermined area based on the presence and actor type information, where the particular safety classification includes: a low safety classification if the presence and actor type information indicates zero actors are present within the predetermined area, a medium safety classification if the presence and actor type information indicates one or more actors are present within the predetermined area and that all of the one or more actors are of a predetermined first type, and a high safety classification if the presence and actor type information indicates one or more actors are present within the predetermined area and that at least one actor of the one or more actors is of a predetermined second type; and after determining the particular safety classification for the predetermined area, providing a safety rule for operating within the predetermined area to a robotic device operating in the environment, where the safety rule corresponds to the particular safety classification.

In another aspect, a non-transitory computer readable medium is provided. The non-transitory computer readable medium has stored thereon instructions, that when executed by one or more processors of a computing device, cause the computing device to perform functions. The functions include: determining presence information and actor type information about any actors present within a predetermined area of an environment using one or more sensors; determining a particular safety classification of the predetermined area based on the presence and actor type information, where the particular safety classification includes: a low safety classification if the presence and actor type information indicates zero actors are present within the predetermined area, a medium safety classification if the presence and actor type information indicates one or more actors are present within the predetermined area and that all of the one or more actors are of a predetermined first type, and a high safety classification if the presence and actor type information indicates one or more actors are present within the predetermined area and that at least one actor of the one or more actors is of a predetermined second type; and after determining the particular safety classification for the predetermined area, providing a safety rule for operating within the predetermined area to a robotic device operating in the environment, where the safety rule corresponds to the particular safety classification.

In another aspect, an apparatus is provided. The apparatus includes: means for determining presence information and actor type information about any actors present within a predetermined area of an environment using one or more sensors; means for determining a particular safety classification of the predetermined area based on the presence and actor type information, where the particular safety classification includes: a low safety classification if the presence and actor type information indicates zero actors are present within the predetermined area, a medium safety classification if the presence and actor type information indicates one or more actors are present within the predetermined area and that all of the one or more actors are of a predetermined first type, and a high safety classification if the presence and actor type information indicates one or more actors are present within the predetermined area and that at least one actor of the one or more actors is of a predetermined second type; and means for, after determining the particular safety classification for the predetermined area, providing a safety rule for operating within the predetermined area to a robotic device operating in the environment, where the safety rule corresponds to the particular safety classification.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 7 is a flowchart of a method, in accordance with an example embodiment.

DETAILED DESCRIPTION

Overview

Figure 1:
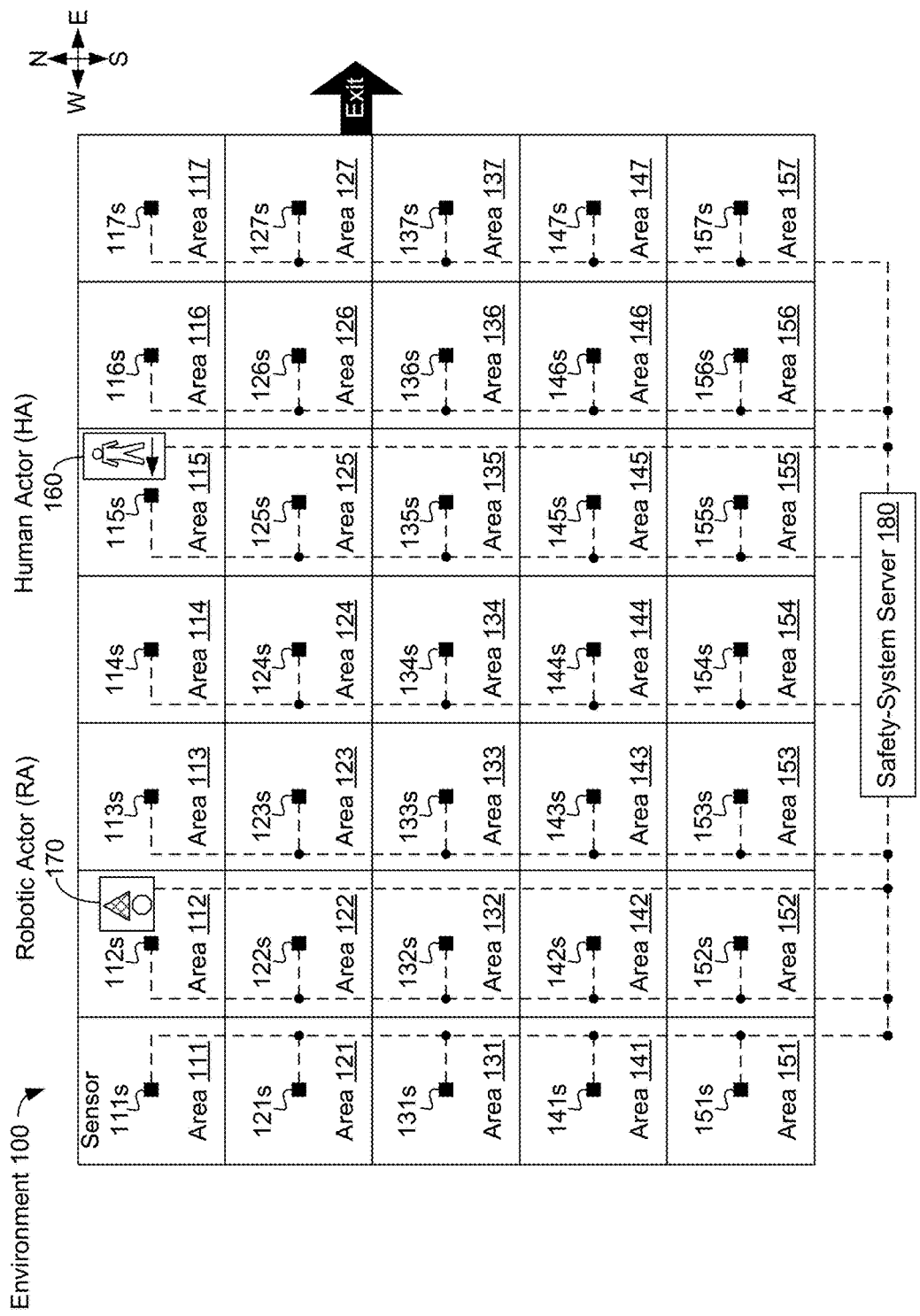
FIG. 1 shows an environment, in accordance with an example embodiment.

When robots and humans work side-by-side in, the robots can be certified for safe use in an integrated human/robotic environment. For example, humans can work with robotic devices such as an automated guided vehicle (AGV) that can deliver items, such as parts or completed products, within indoor environments, such as warehouses, hospitals and/or data centers. An example of a certifiable safety system for environments where humans and robots work side-by-side can involve remote automatic switching between safety modes for mobile robots.

The safety modes can include high, medium, and low safety modes. For instance, the safety system can instruct a robot to operate in a high safety mode when in a high safety area, such as an area surrounding one or more human actors, and perhaps other (robotic) actors. In the high safety mode, the robot can move (much) slower than in a low safety mode and may also slow in advance of entering such the high safety area. While in the low safety mode, the robot can operate at a maximum safe speed to be as efficient as safely possible. As another example, the safety system can instruct a robot to operate in a medium safety mode when in a medium safety area, such as an area where human actors are absent but includes one or more robotic actors. In the medium safety mode, the robot can move at a moderate speed between the relatively-slow speed used in the high safety mode and the relatively-high speed used in the low safety mode.

The safety system can include a safety-system server which can receive global information about environment E1 (that is, information from a number of sources throughout environment E1, and perhaps outside environment E1) to dynamically change local safety regions of environment E1, based on the received information. That is, the safety-system server can receive information from human actors, robotic actors, and/or other devices, such as sensors, in mixed human/robotic environment E1. In some examples, the safety-system server, can receive location data for actors AC1, AC2 . . . operating in environment E1. The location data can come from handheld device localization (using tablets, smart phones, and/or other mobile computing devices used in the environment), fixed sensors mounted to objects in the environment, sensors aboard robots, sensors aboard vehicles utilized by actors to travel within environment E1, and perhaps other sensors. In other examples, the safety-system server can receive other types of information from a number of different types of sensors, such as cameras, light curtains, proximity sensors, infrared, RADAR, SONAR, Radio Frequency Identification (RFID) devices, and other kinds of sensors.

Upon receiving the information from the actor(s) and/or device(s) in environment E1, the safety-system server can change local safety regions by changing safety modes and/or safety rules within areas A1, A2, . . . An of environment E1. That is, the safety-system server can change safety designations, such as safety modes and/or safety rules, to be used within areas of environment E1 and/or change safety designations, such as safety modes and/or safety rules for actors within environment E1. A safety system for a mixed human/robotic environment E1 can determine safety modes or classifications based on a verification of a type of an actor in E1, such as a human actor type, a robotic actor type, an unknown actor type, or some other type. The type of the actor can depend on the identity of the actor; for example, a human employee identified as "Hannah" can have a human actor type, while a robot identified as "Rob" can have a robotic actor type. Then, each actor can have a device, such as a device with an RFID chip or other device with actor type and/or identification information, that can provide actor type and/or identification information for the actor on a periodic basis, upon request from an external device (such as server), when entering and/or exiting an area with environment E1, and/or based on some other criteria.

Safety certification for obtaining location and other data used by the safety system can involve verifying that the safety system has multiple, redundant communication paths for information, such as information about locations within an environment that are safe to operate or parameters related to safe operation; e.g., a maximum traveling speed. Information conveyed using one communication path of the safety system can then be cross-checked by information conveyed over another communication path of the safety system. For example, a location of a robot R1 in environment E1 can be determined using an on-board sensor OBS and communicated to the safety-system server can be checked with location data from fixed location sensors FLS1, FLS2 . . . also operating in environment E1. Then the safety-system server can cross-check the location of robot R1 using data from on-board sensor OBS with data from fixed location sensors FLS1, FLS2 . . . .

By providing a safety system as described herein that allows robotic devices to operate at different rates based on different safety modes in different areas, the robotic devices can operate efficiently and safely while in a mixed human/robotic environment. The safety system can be a global system using one or more safety-system servers that dynamically change safety regions locally based on inputs from visual and other sensors, as discussed above. In some embodiments, such safety systems can be certified by a regulatory agency or other entity to provide a secure environment for human actors in a mixed human/robotic environment.

Safety Systems for Environments with Robotic and Human Actors

FIG. 1 shows environment 100, in accordance with an example embodiment. Environment 100, which can be an example embodiment indoor building like a warehouse or an open expanse outdoors, is divided into 35 areas. The 35 areas include areas 111-117 making up a northernmost row of areas in environment 100, areas 121-127 making a second-from-northernmost row of areas in environment 100, areas 131-137 making a middle row of areas in environment 100, areas 141-147 making a second-from-southernmost row of areas in environment 100, and areas 151-157 making a southernmost row of areas in environment 100.

An environment E1 where both robotic and human actors operate, such as environment 100, can be divided into N areas $A_1, A_2 \ldots A_n$, where locations within E1 can be specified in terms of the N areas. Some or all of the N areas can have a regular geometry and/or have the same size/area; e.g., some or all of $A_1, A_2 \ldots A_n$ can be same-sized squares, rectangles, triangles, hexagons, circles. For example, environment 100 is divided into 35 same-sized squares. In some cases, the N areas in environment E1 do not overlap; e.g., the N areas can tessellate E1 as in the case of environment 100; while in other cases, some or all of the N areas overlap. Then, location data for actors AC1, AC2, in N can be related to areas $A_1, A_2 \ldots A_n$; for example, location data for actor AC3 at a location (x, y) within area $A_{54}$ can indicate that AC3 is within area $A_{54}$. In still other examples, E1 can be divided into $N_v$ volumes $V_1, V_2 \ldots V_{N_v}$ instead of into N areas.

FIG. 1 shows that environment 100 includes human actor (HA) 160 and robotic actor (RA) 170; in other examples, more or fewer human actors and/or robotic actors can be present in environment 100 than shown in FIG. 1. Each actor 160, 170 is shown in FIGS. 1-4 outlined by a box that includes a representation of the actor's location, a cartoon of a person for human actors, such as human actor 160, or a triangle for a robotic actor, such as robotic actor 170, and an symbol representing the actor's direction of travel. For example, human actor 160 in area 115 (the north-eastern corner of environment 100) has a westward pointing arrow indicating that human actor 160 is moving west. As another example, robotic actor 170 in area 112 has an octagon within its outline box to indicate robotic actor 170 has come to a stop.

FIG. 1 shows that environment 100 includes sensors 111s-157s uniformly distributed throughout. Sensors 111s-157s can act as a grid of sensors to provide information for a safety system. Each of areas 111-157 in environment 100 has a corresponding sensor; for example, FIG. 1 shows that area 111 in the northwest corner of environment 100 has sensor 111s.

Sensor 111s can include one or more presence sensors configured at least to provide presence information about area 111. The presence information can include information indicating whether or not one or more actors are present (or are not present) within an area. The one or more presence sensors can include, but are not limited to, motion detectors, light curtains, proximity sensors, and/or cameras. Sensor 111s can include one or more identity sensors configured to provide actor type information about any actors present within area 111. The actor type information can include information about a role, type, classification, identity, and/or related information specific to an actor that can be used to identify and/or classify the actor. The one or more identity sensors can include, but are not limited to, RFID readers, badge readers, cameras, light sensors, sound sensors (i.e., microphones), ultrasonic sensors, and/or biometric sensors. For instance, each human and/or robotic actor in environment 100 may be given a separate RFID device (e.g., an RFID tag, an RFID chip), and sensor 111s can include a RFID reader. In some cases, RFID devices of robotic actors can be used to differentiate robot motion from human motion. In some embodiments, a size of area 111 can be based on a range of a RFID reader of sensor 111s. In other cases, a size of area 111 could be adjusted based on different types of robots or robot operations.

In other embodiments, a camera can be used to identify features, such as faces or identification numbers, of actors in area 111. The actor can also be identified by the camera and detection of other visual indicators of identity; e.g., by classifying an actor based on different types of movement, by lights and/or patterns of light carried by or otherwise associated with an actor. For example, a robotic actor assigned with an identity number such as "582" can have a display, light source, light emitting diodes (LEDs), and/or other lighted materials (e.g., flashing or non-flashing lights) that indicate the numbers "582" and so identify the robotic actor. As another example, a light source can generate one or more light bursts that can identify an associated actor; e.g., a light source associated with actor "247" can emit a pattern of two light bursts, followed by four light bursts, and then followed by seven light bursts. Then, the pattern of two, then four, then seven light bursts can signal "247" and so identify actor "247".

In still other embodiments, an actor can have or otherwise be associated with an sound emitter (e.g,. a loudspeaker, ultrasonic sound generator, or other sound-generating device) that can emit sounds that identify the actor; e.g., for robotic actor "582", the sound emitter can play an audio message such as "I am robotic actor 582" to identify the robotic actor. As another example, an ultrasonic sound generator can generate one or more ultrasonic sounds that can identify an associated actor; e.g., an ultrasonic sound generator for robotic actor "582" can emit a pattern of five ultrasonic sound blasts, followed by eight ultrasonic sound blasts, and then followed by two ultrasonic sound blasts. Then, the pattern of five, then eight, then two ultrasonic sound blasts can signal "582", and so identify robotic actor "582". Other techniques for identifying human and/or robotic actors are possible as well.

Other sensors can be included with sensor 111s as well; e.g., some or all of sensors 620 discussed below in the context of FIG. 6A. Other sensors 112s-157s in environment 100 can include the same or a similar sensor configuration as discussed above for sensor 111s. Also, sizes of some or all areas 112-157 can depend on the capabilities; e.g., RFID ranges, of the respective sensors 112s-157s within the area, such as discussed above regarding the size of area 111.

In some embodiments, sensors in environment 100, such as sensor 111s, can include redundant presence and/or identity sensors to increase reliability of the safety system; that is, sensor 111s can include two or more presence sensors and/or two or more identity sensors. As redundant sensors, the two or more presence sensors and/or the two or more identity sensors can be of a same kind, manufacture, and/or model. For example, if one of the two or more identity sensors fails and all of the identity sensors are the same kind and be of the same model from the same manufacturer, the other working identity sensor(s) can seamlessly perform the same task as the failed identity sensor. In other cases, the two or more presence sensors and/or the two or more identity sensors can be of different kinds, manufactures, and/or models. The redundant sensors can be used to provide presence and/or actor type information by independent communication paths to safety-system server 180 and/or other computing device(s), which can receive, process, and send information for the safety system. For example, presence and/or actor type information can then be used to determine identifying information about actors in environment 100, safety rules, safety gradient maps, etc.

FIG. 1 shows that each of sensors 111s-157s is communicatively connected to safety-system server 180. Safety-system server 180 can be at least part of a safety system that can dynamically change local safety regions based on global information received from sources throughout environment 100, such as sensors 111s-157s, sensors associated with robotic actors, sensors associated with human actors, and/or other sources of information. For example, safety-system server 180 can communicate with sensors 111s-157s using wired and/or wireless communications. In some embodiments, safety-system server 180 can be redundantly connected to some or all of sensors 111s-157s; e.g., safety-system server 180 can be connected to and communicate with some or all of sensors 111s-157s using two or more communications paths. In particular of these embodiments, sensors 111s-157s and/or safety-system server 180 can have redundant components to ensure at least no single point of failure can disable any one of sensors 111s-157s, safety-system server 180, and/or communications paths between sensors 111s-157s and server 180.

In redundant embodiments, sensors 111s-157s, safety-system server 180, and/or interconnections between the sensors and server 180 can operate in various operations modes, such as an all active mode where all available sensors, components of server 180 and communications paths are actively operating, or in an active-standby, where some components are marked active and actively operate, and other components are marked standby and become active either upon failure of a corresponding active sensor, server (component), or communication path or upon command. Other operations modes of redundant sensors, server components, and communications paths can be used in environment 100 as well.

In some embodiments, such as shown in FIG. 1, human actor 160 and robotic actor 170 can be in communication with safety-system server 180. For example, human actor 160 and robotic actor 170 can provide location, identification, and/or other information directly to safety-system server 180. As another example, human actor 160 and robotic actor 170 can receive safety-related information, such as safety-area information, safety gradient maps, and safety rules, and/or other information from safety-system server 180. In particular embodiments, only some actors, such as some or all robotic actors and/or actors tasked with maintaining and operating safety-system server 180, may be in direct communication with safety-system server 180.

Based on a location and a role of an actor, a safety area around an actor can be determined. For example, if environment E1 is divided into N areas, areas $A_1, A_2 \ldots A_n$, and human actor Hannah is within area $A_{10}$, then robotic actor Rob can consider area $A_{10}$ to be part of the safety area. Rob can learn about Hannah's presence in area $A_{10}$ from safety-system server 180. The safety area can depend on one or more trajectories of human and/or robotic actors. For example, if Hannah is traveling between area $A_{10}$ and adjacent area $A_{11}$, then the safety-system server 180 can instruct Rob that areas $A_{10}$ and $A_{11}$ are in the safety area and perhaps provide related safety rules for operating in the safety area.

Figure 2:
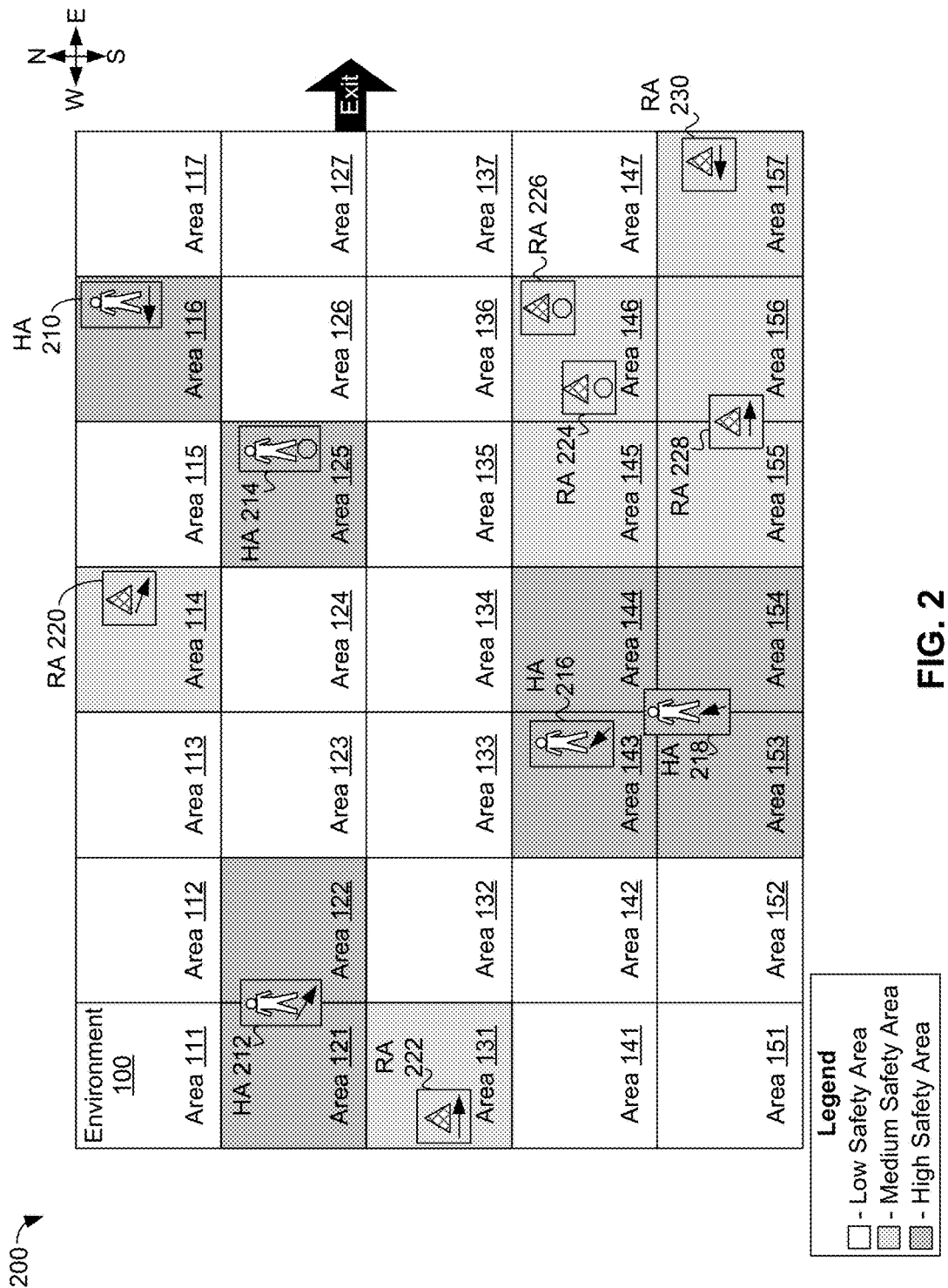
FIG. 2 shows a scenario involving the environment of FIG. 1, in accordance with an example embodiment.

FIG. 2 shows scenario 200 with safety areas specified for environment 100, in accordance with an example embodiment. Scenarios 200, 300, and 400 described with regards to FIGS. 2-4 all refer to environment 100. However, FIGS. 2-4 do not show all of the components of environment 100 to reduce clutter; components present in environment 100 but not shown in FIGS. 2-4 include sensors 111s-157s, safety-system server 180, and communications links with safety-system server 180.

In scenarios 200, 300, and 400, safety-system server 180 and/or other computing device(s) can keep track of safety areas as part of a safety gradient map. For example, high safety areas within environment E1 where human actors are located (and perhaps other sensitive actors, such as robots carrying sensitive cargo or in need of maintenance) can have a highest safety value. Areas of environment E1 surrounding the high safety areas can be classified as medium safety and have a medium safety value. In other cases, areas of environment E1 having only (non-sensitive) robotic actors can be marked as medium safety areas. Other areas in environment E1 can be classified as low safety and have a low safety value. Areas of overlap; e.g., an area where no humans or sensitive actors are present, but is adjacent to multiple areas where humans/sensitive actors are present, can have a higher safety value than an area adjacent to only one area where humans/sensitive actors are present. In some cases, trajectories of humans/sensitive actors can affect safety values; e.g., if human actor Howard is in area $A_{52}$ and moving west, then an adjacent area $A_{51}$ west of area $A_{52}$ can have a higher safety value than an adjacent area $A_{53}$ east of area $A_{52}$. Then, safety-system server 180 can maintain the safety gradient map with the safety values for areas $A_1, A_2 \ldots A_n$ in environment E1.

Safety rules used by a robotic actor can be based on the safety gradient map. A safety rule (related to an area A) can instruct an actor, particularly a robotic actor, to use one or more safety procedures (while in area A). For example, a robotic actor can be instructed to use maximum safety procedures; e.g., reduce maximum speed, turn on local object detection devices, etc., when in an area indicated by the safety gradient map (or otherwise indicated) having a high safety value. The robotic actor can determine a safety value SV is a high safety value by determining that SV is above a highly-safe safety-value threshold, or perhaps using another technique. As another example, a robotic actor can be instructed to use at least medium safety procedures; e.g., reduce maximum speed but leave local object detection devices off, etc., when in an area indicated by the safety gradient map (or otherwise indicated) having a medium safety value.

The robotic actor can determine that safety value SV is a medium safety value by determining that SV is below the highly-safe safety-value threshold, but above a medium-safe safety-value threshold, or perhaps using another technique. In other examples, a robotic actor can be instructed to use at least minimum safety procedures; e.g., allow use of maximum speed, leave local object detection devices off, etc., when in an area indicated by the safety gradient map (or otherwise indicated) having a low safety value. The robotic actor can determine that safety value SV is a low safety value by determining that SV is below the medium-safe safety-value threshold, or perhaps using another technique. Other safety values, safety rules, and techniques for using safety gradient maps for determining safety areas are possible as well.

In scenario 200, safety-system server 180 and/or other computing device(s) (e.g., a computing device aboard a robotic actor, a mobile device carried by a human actor) can receive presence/location and identification data for human actors 210, 212, 214, 216, 218 and robotic actors 220, 222, 224, 226, 228, 230. The presence/location and identification data can be provided by sensors 111s-157s embedded in environment 100. In some embodiments, some or all presence/location and identification data can be provided by items carried by human actors 210, 212, 214, 216, 218 and robotic actors 220, 222, 224, 226, 228, 230; e.g., RFID devices, RFID chips, RFID tags, magnetic media/ID chips on ID badges or other such media, GPS and/or other location sensors embedded in device(s) of a robotic actor and/or in a device (such as a mobile computing device, head-mountable device, and/or smartphone) carried/worn by a human actor.

Safety-system server 180 and/or other computing device(s) can determine a safety classification for each of areas 111-157 in environment 100 using the received presence/location and identification data. A safety classification of an area A can be a categorization or ranking indicating how much caution should be used by an actor, particularly a robotic actor, while operating in area A. In some embodiments, the safety classification can be one of a low safety classification, a medium safety classification, and high safety classification.

For example, in scenario 200, safety-system server 180 and/or other computing device(s) can classify an area A in environment 100 with:
 the high safety classification if area A is not otherwise classified and if area A is at least partially occupied by one or more human actors;
 the medium safety classification if area A is not otherwise classified and if area A is at least partially occupied by one or more robotic actors; or
 the low safety classification if no actors are at least partially present within area A.

In other embodiments, safety-system server 180 can use more, fewer, and/or other safety classifications; e.g., a numerical scale for safety, such as a safety class ranging from 1 being very safe (or very dangerous) to a safety class of 10 being very dangerous (or very safe), an alphabetical scale (e.g., A=very safe to D (or F)=very dangerous or vice versa), another qualitative scale; e.g., use of classifications such as moderately safe, moderately unsafe, very dangerous, etc.

Safety-system server 180 can provide safety rules to robotic (and perhaps other) actors in environment 100. The safety rules can correspond to the safety classifications of areas within environment 100; as such, a particular safety rule can be used in more than one area 111-157 of environment 100 based on the safety classifications of the areas 111-157 of environment 100.

For example, robotic (and perhaps other) actors can use: a low safety rule in areas classified with the low safety classification, a medium safety rule in areas classified with the medium safety classification, and a high safety rule when the particular safety classification is the high safety classification, where each of these three safety rules can differ. For example, the low safety rule can relate to fewer safety-related provisions of the robotic device than the medium safety rule, and the medium safety rule can relate to fewer safety-related provisions of the robotic device than the high safety rule. In some embodiments, the low safety rule can specify a higher maximum speed than specified in the medium safety rule, and the medium safety rule can specify a higher maximum speed than specified in the high safety rule.

In other embodiments, the medium safety rule can specify that a robotic actor is to slow down upon entry and/or exit of one of areas 111-157 of environment 100, while the high safety rule can specify that a robotic actor is to stop for at least a predetermined amount of time (e.g., a second) upon entry and/or exit of one of areas 111-157 of environment 100, and the low safety rule can be silent about (not specify) slowing down or stopping upon entry and/or exit of one of areas 111-157.

In another example, the medium and/or high safety rules can specify use of additional safety-related sensors by robotic devices than specified by the low safety rule. For example, suppose a robotic device has three types of location sensors: a low-resolution sensor, a medium-resolution sensor that can provide more accurate location information than the low-resolution sensor, and a high-resolution sensor that can provide more accurate location information than the medium-resolution sensor than the medium resolution sensor. Then, the low safety rule can specify use of at least the low-resolution sensor, the medium safety rule can specify use of at least the low- and medium-resolution sensors, and the high safety rule can specify use of at least the low-, medium-, and high-resolution sensors. In a related example, a robotic device can be configured with a local safety system that, when active, ensures the robotic device is operating a safer condition than when the local safety system is not active. Then, if the low safety rule does not specify use of the local safety system, then at least one of the medium and high safety rules can specify use of the local safety system; of course, if the low safety rule does specify use of the local safety system, then the medium and high safety rules can also specify use of the local safety system. Many other example safety rules are possible as well.

FIG. 2 shows that, safety-system server 180 and/or other computing device(s) can use the received presence/location and identification data of scenario 200 to determine that:
 human actors 210, 214, and 216 are in respective areas 116, 125, and 143 of environment 100;
 human actor 212 is between areas 121 and 122;
 human actor 218 is at or near the intersection point of areas 143, 144, 153, and 154;
 robotic actors 220, 222, 224, 226, and 230 are in respective areas 114, 131, 146, 146, and 157; and
 robotic actor 228 is between areas 155 and 156.

Then, safety-system server 180 and/or other computing device(s) can determine that each of respective areas 116, 121, 122, 125, 143, 144, 153, and 154 is at least partially occupied by one or more human actors, and thus can be classified as high safety areas. High safety areas are shown in FIG. 2 using relatively-dark grey shading. Both of areas 121 and 122 can be considered as high safety areas as human actor 212 is between areas 121 and 122. Also, all four of areas 143, 144, 153, and 154 can be considered as high safety areas as human actor 218 is at or near the intersection point of the four areas and so can be considered to be at least partially occupying all four areas.

In scenario 200, areas not already classified and at least partially occupied by one or robotic actors can be classified as medium safety areas; then, safety-system server 180 can classify areas 114, 131, 145, 146, and 155-157 as medium safety areas. Medium safety areas are shown in FIG. 2 using relatively-light grey shading in comparison to the relatively-dark grey shading used for high safety areas. Both of areas 155 and 156 can be considered as medium safety areas as robotic actor 228 is between areas 155 and 156 and so can be considered to be at least partially occupying both areas.

Additionally, safety-system server 180 and/or other computing device(s) can classify areas not having any actors at least partially present as low safety areas. In scenario 200, areas 111-113, 115, 117, 123, 124, 126, 127, 132-137, 141, 142, 147, 151, and 152 therefore can be classified as low safety areas. Low safety areas are shown in FIG. 2 without shading.

FIGS. 3A-3H show scenario 300 with safety areas specified for environment 100, in accordance with an example embodiment. Throughout scenario 300, safety-system server 180 and/or other computing device(s) (e.g., a computing device aboard a robotic actor, a mobile device carried by a human actor) can receive presence/location and identification data for human actors 210, 212, 214, 216, 218 and robotic actors 220, 222, 224, 226, 228, 230.

Figure 3A:
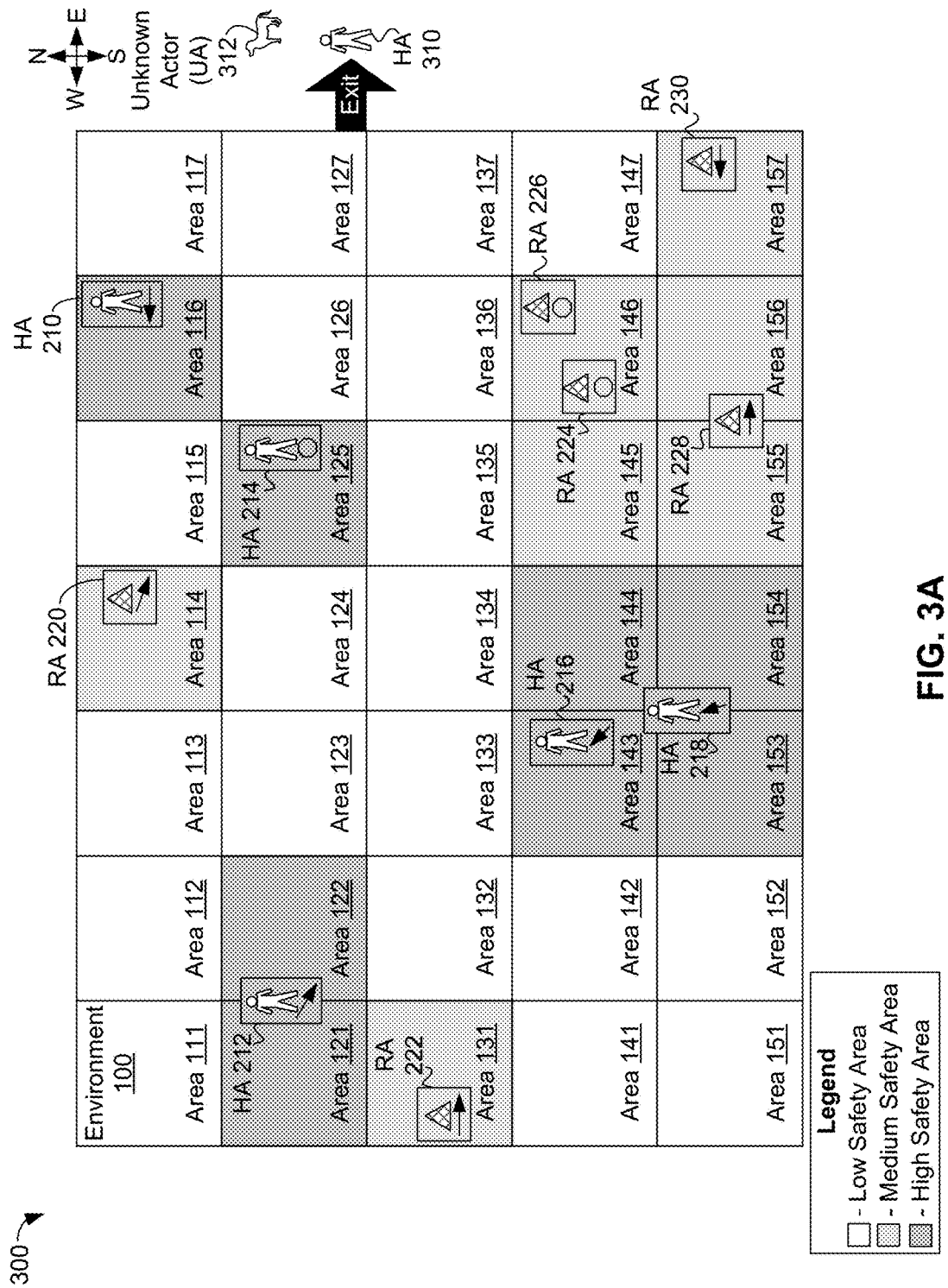
FIGS. 3A-3H show another scenario involving the environment of FIG. 1, in accordance with an example embodiment.

At the beginning of scenario 300 and as indicated in FIG. 3A, safety-system server 180 and/or other computing device(s) can use received presence/location and identification data to determine that:
- human actors 210, 214, and 216 are in respective areas 116, 125, and 143 of environment 100;
- human actor 212 is between areas 121 and 122;
- human actor 218 is at or near the intersection point of areas 143, 144, 153, and 154;
- robotic actors 220, 222, 224, 226, and 230 are in respective areas 114, 131, 146, 146, and 157; and
- robotic actor 228 is between areas 155 and 156.

In scenario 300, the classification of high, medium, and low safety areas is the same as in scenario 200. For classifying high safety areas, safety-system server 180 and/or other computing device(s) can determine that each of respective areas 116, 121, 122, 125, 143, 144, 153, and 154 is at least partially occupied by one or more human actors. High safety areas are shown in FIGS. 3A-3H using relatively-dark grey shading.

In scenario 300, areas not already classified and at least partially occupied by one or robotic actors can be classified as medium safety areas; then, safety-system server 180 can classify areas 114, 131, 145, 146, and 155-157 as medium safety areas. Medium safety areas are shown in FIG. 3A using relatively-light grey shading in comparison to the relatively-dark grey shading used for high safety areas.

Additionally, safety-system server 180 and/or other computing device(s) can classify areas not having any actors at least partially present as low safety areas. In scenario 300, areas 111-113, 115, 117, 123, 124, 126, 127, 132-137, 141, 142, 147, 151, and 152 can be initially classified as low safety areas. Low safety areas are shown in FIG. 3A without shading.

Scenario 300 has two additional actors in comparison with scenario 200. At the beginning of scenario 300 as shown in FIG. 3A, both human actor 310 and unknown actor 312 are outside of environment 100 near area 127.

Figure 3B:
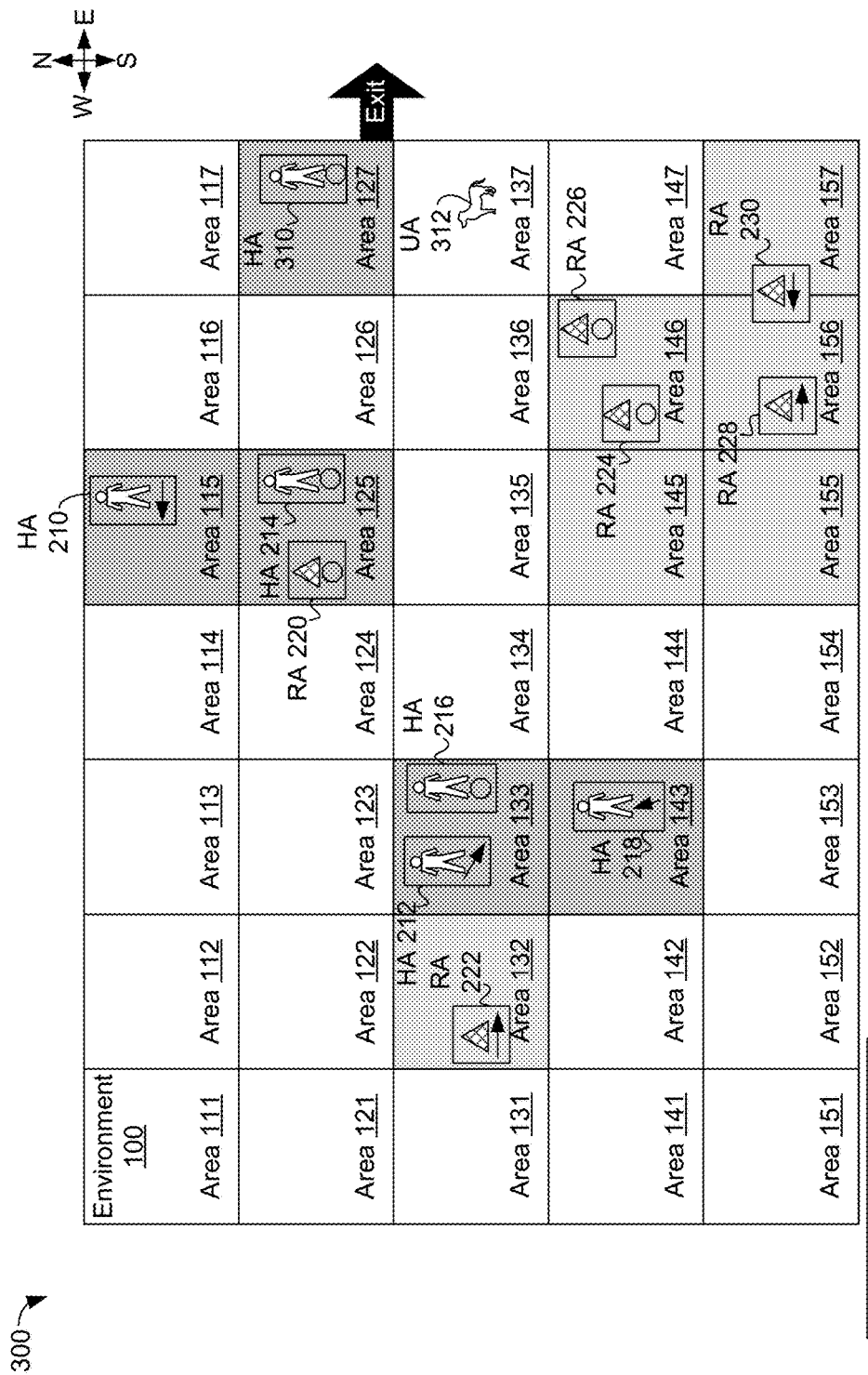

Scenario 300 continues as shown in FIG. 3B, which indicates safety-system server 180 and/or other computing device(s) can use received presence/location and identification data to determine that, with respect to the positions of actors shown in FIG. 3A:
- human actors 210, 212, 216, and 218 have respectively moved to areas 115, 133, 133, and 143 of environment 100;
- human actor 214 remained in area 125;
- human actor 310 has entered environment 100 and is currently within area 127;
- robotic actors 220, 222, and 228 have respectively moved to areas 125, 132, and 156;
- robotic actors 224, 226 both remained in area 146; and
- robotic actor 230 is between areas 156 and 157.

Then, safety-system server 180 and/or other computing device(s) can determine that each of respective areas 115, 125, 127, 133, and 143 is not already classified and is at least partially occupied by one or more human actors and so classify these areas as high safety areas.

In classifying medium safety areas, safety-system server 180 and/or other computing device(s) areas can determine that each of respective areas 132, 145, 146, and 155-157 is not already classified and is least partially occupied by one or more robotic actors and so can be classified as medium safety areas. The areas not classified as high or medium safety areas; that is, areas 111-114, 116, 117, 121-124, 126, 131, 134-137, 141, 142, 144, 147, and 151-154, can be classified as low safety areas by safety-system server 180 and/or other computing device(s); areas 111-114, 116, 117, 121-124, 126, 131, 134-137, 141, 142, 144, 147, and 151-154, can also be classified as low safety area due the absence of actors in those areas.

Scenario 300 can continue with unknown actor 312 entering environment 100 at the same time as human actor 310. Safety-system server 180 and/or other computing device(s) can also receive data from sensors, such as but not limited to sensors 126s, 127s, 136s, 137s, 146s, and 147s to determine than an unknown actor (likely) is in area 137, as shown in FIG. 3B. For example, safety-system server 180 can receive presence/location data that an actor is in area 137; e.g., unknown actor 312, while not receiving related identification data for the actor in area 137. As such, safety-system server 180 and/or other computing device(s) can determine an unknown actor (likely) is in area 137.

Figure 3C:
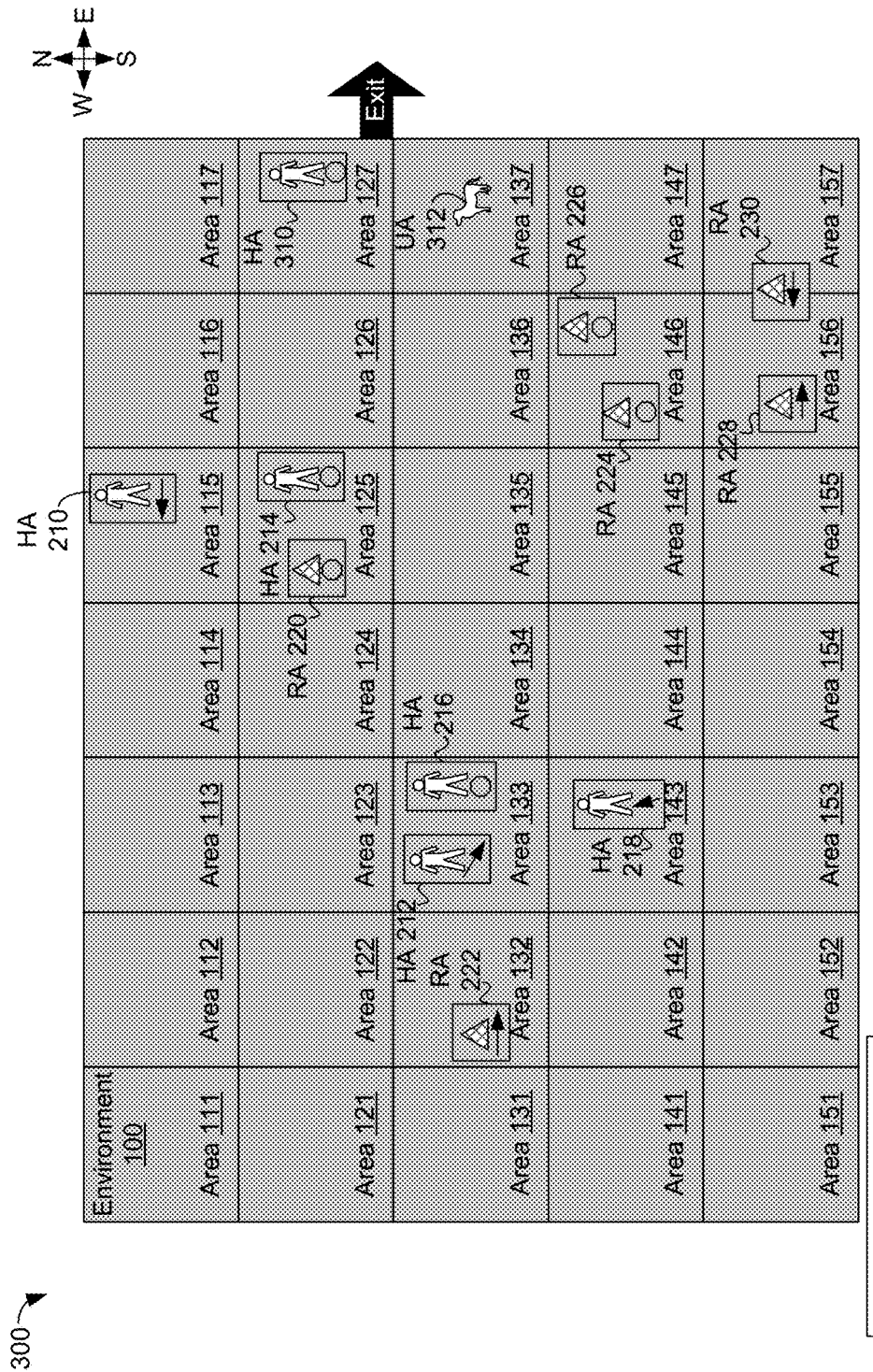

Scenario 300 continues as shown in FIG. 3C after safety-system server 180 and/or other computing device(s) have determined an unknown actor is in environment 100. In scenario 300, safety-system server 180 and/or other computing device(s) can indicate all areas in environment 100 are high safety areas while the unknown actor is not identified and/or removed from environment 100. The indication that all areas in environment 100 are high safety areas is shown in FIG. 3C using relatively-dark shading throughout environment 100.

In scenario 300, safety-system server 180 and/or other computing device(s) can also send an emergency safety rule with one or more commands to stop and/or shut down all robotic devices while the unknown actor is not identified and/or removed from environment 100. Additionally, safety-system server 180 and/or other computing device(s) can request human actor(s) assist in locating, identifying, and/or removing unknown actor 312—in scenario 300, human actor 214 is requested to locate, identify, and perhaps remove the unknown actor in area 137 from environment 100. In other scenarios, designated robotic actors can assist in locating, identifying, and/or removing unknown actors from environment 100.

Figure 3D:
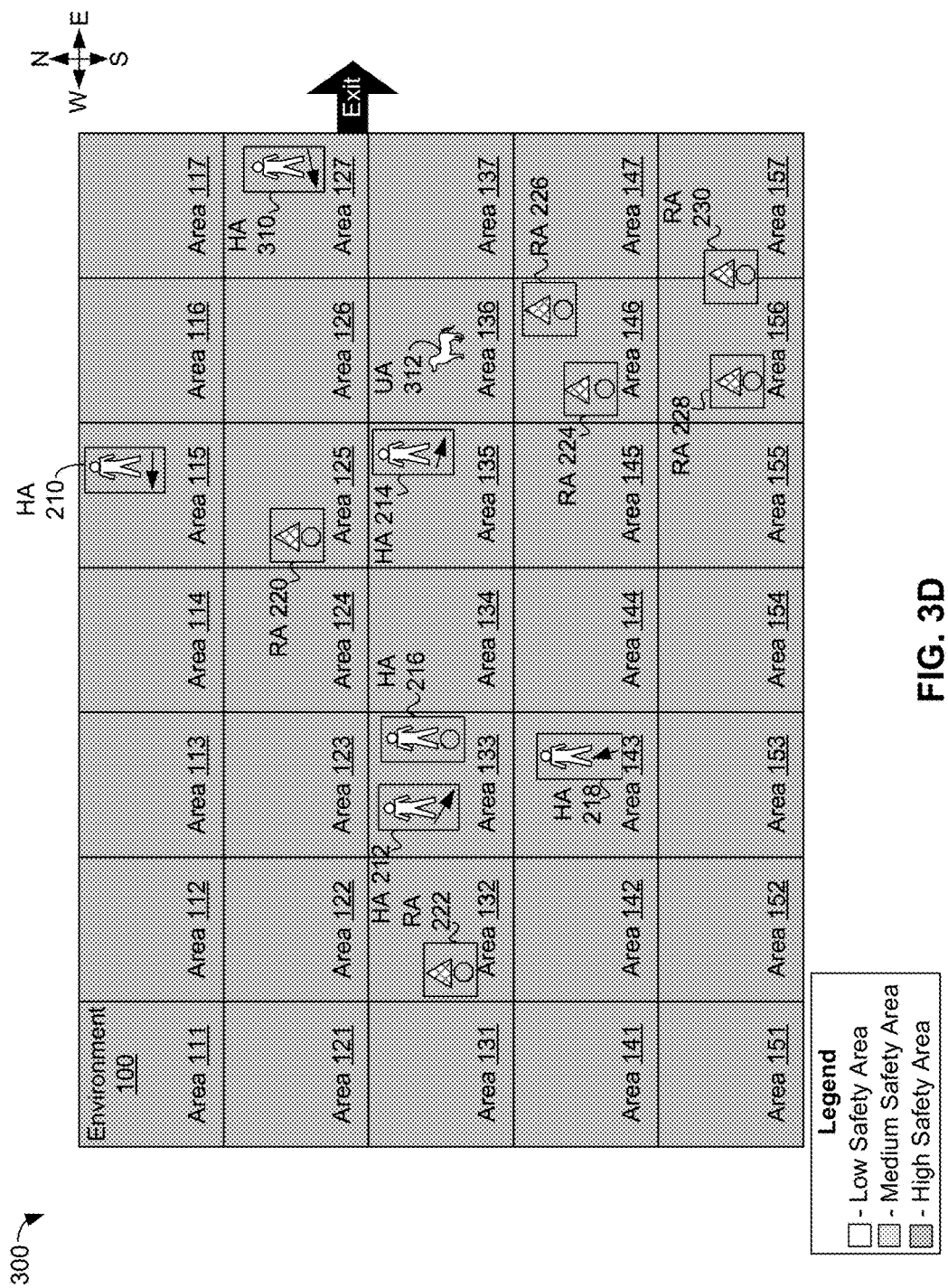

Scenario 300 continues, as shown in FIG. 3D, with the entirety of environment 100 designated as a high safety area. Also, robotic actors 220-230 have stopped while human actor 214 searches for unknown actor 312 in accord with the emergency safety rule sent by safety-system server 180 and/or other computing device(s) to stop and/or shut down all robotic devices.

Figure 3E:
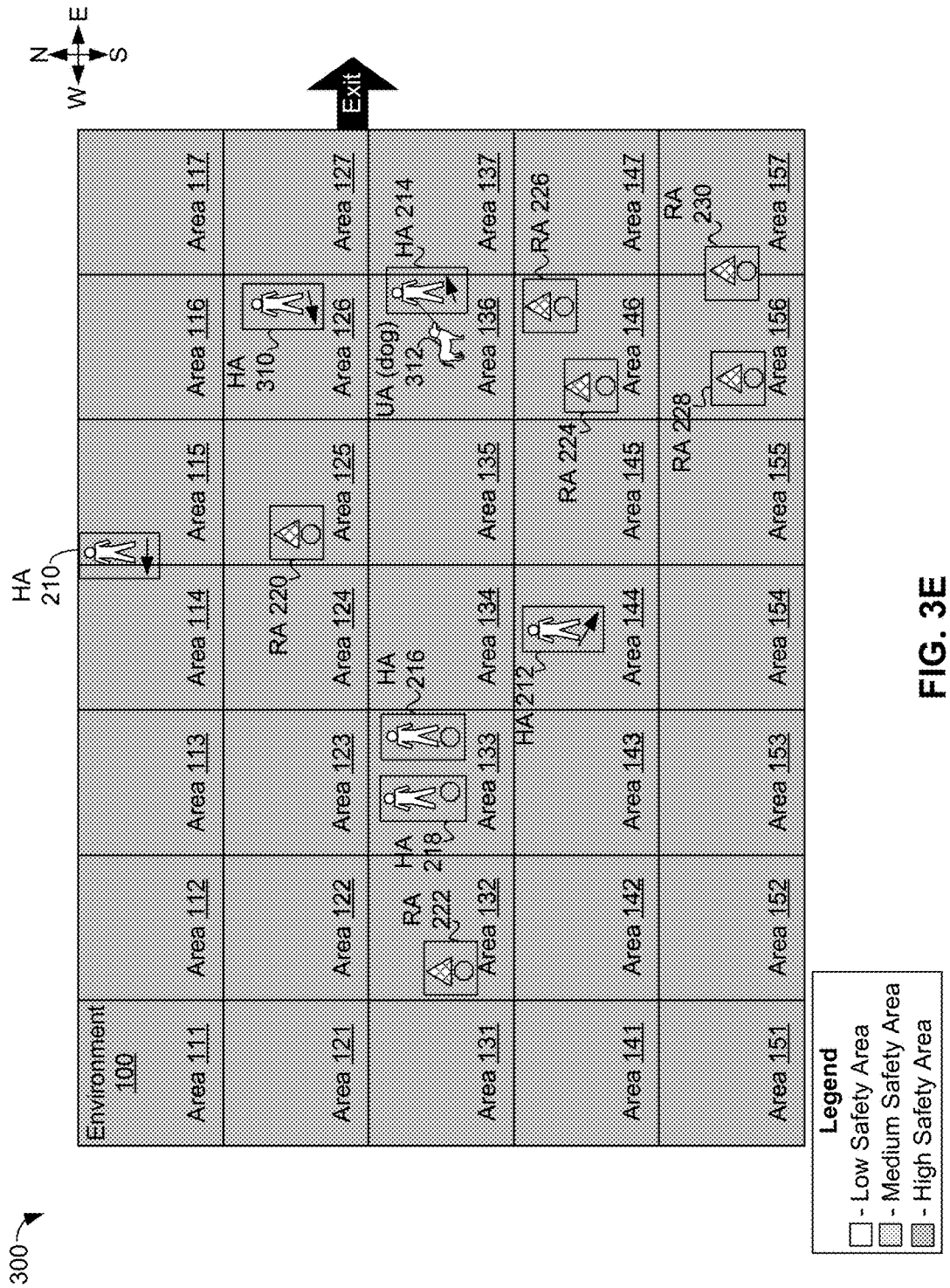

FIG. 3E shows that scenario 300 continues with human actor 214 has finding and collaring a dog identified as unknown actor 312 in area 136 of environment 300. Human actor 214 can inform safety-system server 180 and/or other computing device(s) that unknown actor 312 has been located and will remain in the same area as human actor 214 while unknown actor 312 is present within environment 100. In some cases, after locating an unknown actor, such as unknown actor 312, within environment 100, the unknown actor can be provided with (temporary) sensors to provide location and/or actor type information to allow safety-system server 180 and/or other computing device(s) to locate and identify the unknown actor while present in environment 100.

Scenario 300 continues with safety-system server 180 and/or other computing device(s) determining that unknown actor 312 is located in area 136. In scenario 300, unknown actor 312 is escorted out of environment 100 by human actor 214. After unknown actor 312 has been located, the portion of environment 100 where unknown actor 312 can affect operations within environment 100 can be localized to a region near unknown actor 312. For example, safety-system server 180 and/or other computing device(s) can determine a safety buffer (SB) of high safety areas that surrounds an unknown actor accurately located and present within environment 100, such as safety buffer 320 shown in FIG. 3F surrounding unknown actor 312 in area 136.

After designating high safety areas within safety buffer 320, including areas 125-127, 135-137, and 145-147, other areas of environment 100 can be classified as high, medium, or low safety areas based on human and robotic presence as discussed above in the context of FIG. 3A. Safety-system server 180 and/or other computing device(s) can use received presence/location and identification data to determine that, with respect to the positions of actors shown in FIG. 3B (the last depiction of safety areas before all of environment 100 was designated as a high safety area due to the entry of unknown actor 312):

human actors 210, 214, 218, and 310 have respectively moved to areas 114, 127, 133, and 126;
human actor 212 is now between areas 144 and 145;
human actor 216 remained in area 133;
human actor 310 has entered environment 100 and is currently within area 126;
robotic actors 220, 222, 224, 226, and 228 have stopped and remain in respective areas 125, 132, 146, 146, 156; and
robotic actor 230 is stopped between areas 156 and 157.

Then, after designating areas 125-127, 135-137, and 145-147 as high safety areas due to their presence in safety buffer 320, safety-system server 180 and/or other computing device(s) can additionally designate areas 114, 133, and 144 as high safety areas due to the at least partial occupation of each of those areas by one or more human actors. Safety-system server 180 and/or other computing device(s) can also designate areas 132, 156, and 157 as medium safety areas, as each of areas 132, 156, and 157 was not otherwise designated and is at least partially occupied by one or more robotic actors. Additionally, safety-system server 180 and/or other computing device(s) can also designate areas 111-113, 115-117, 121-124, 131, 134, 141-143, and 151-155 as low safety areas, as each of these areas is devoid of actors.

Figure 3F:
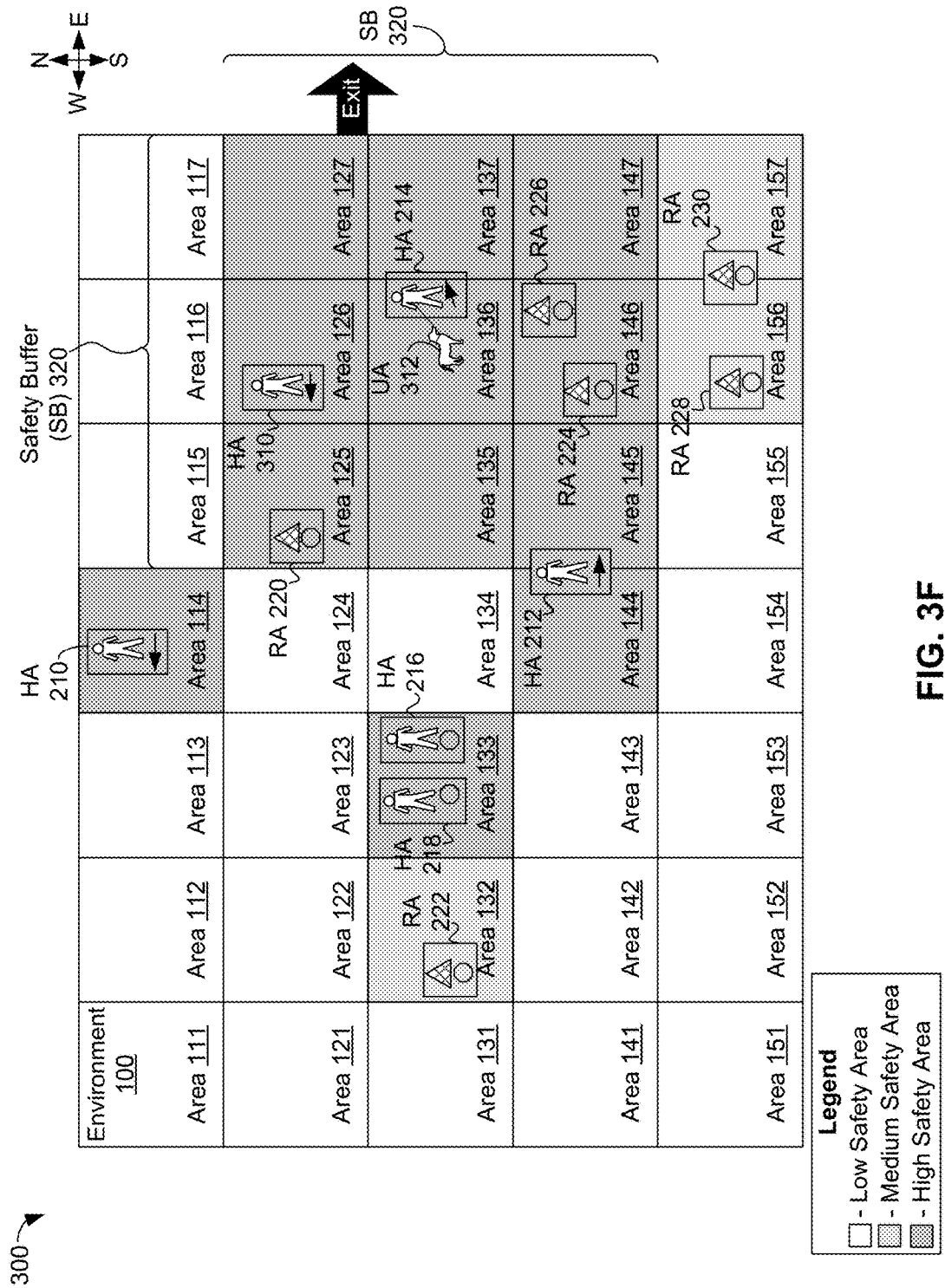
Figure 3G:
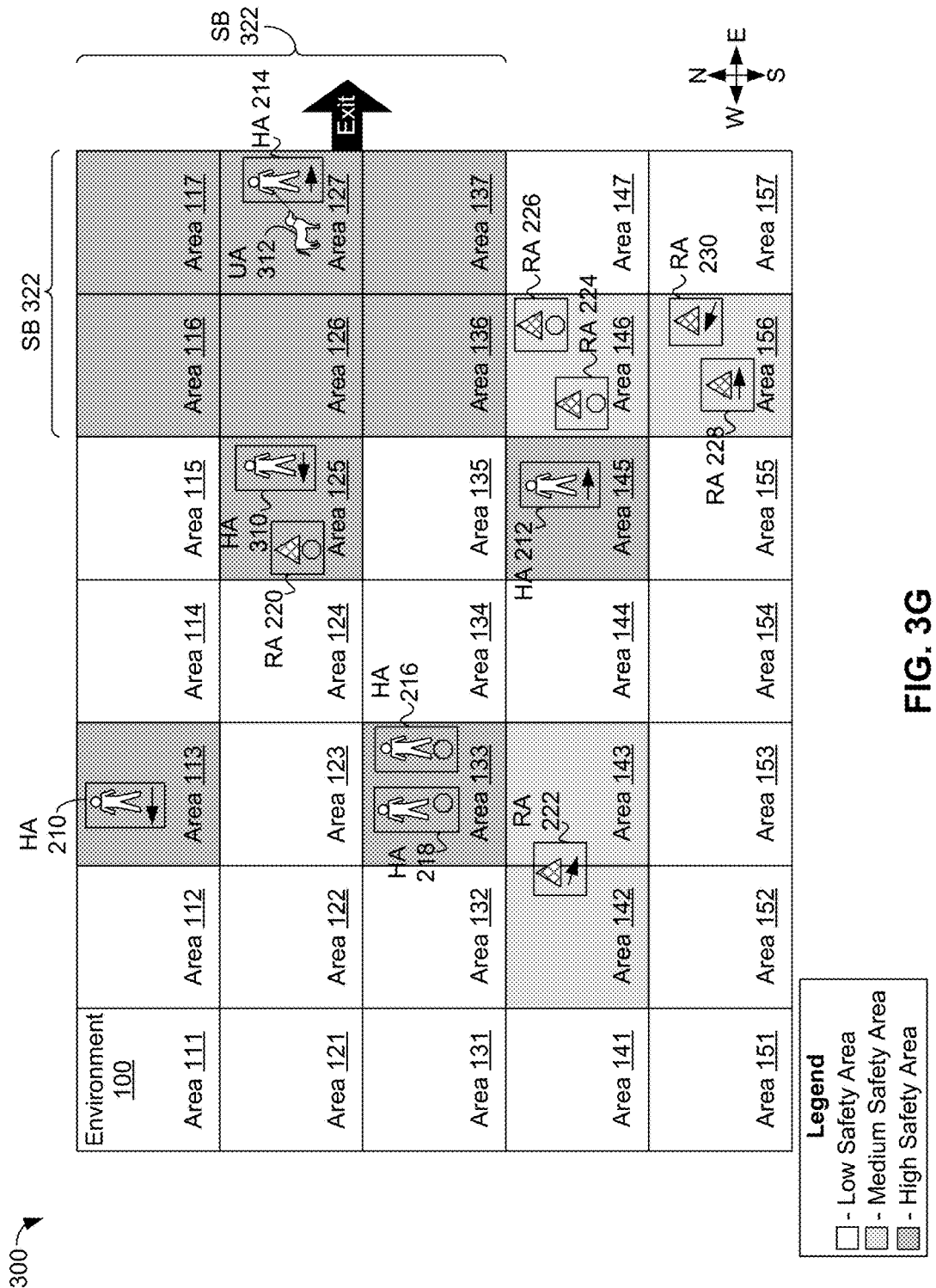

Scenario 300 continues with human actor 214 leading unknown actor 312 to area 127 as shown in FIG. 3G. As such, safety-system server 180 and/or other computing device(s) can use received presence/location and identification data for human actor 214 and perhaps unknown actor 312 to determine safety buffer 322 shown in FIG. 3G in the same way as safety buffer 320 (shown in FIG. 3F) was determined FIG. 3G shows that safety buffer 322 includes designations of areas 116, 117, 126, 127, 136, and 137 as high safety areas.

In addition, safety-system server 180 and/or other computing device(s) can use received presence/location and identification data to update safety information for environment 100 after determining that, with respect to the positions of the actors shown in FIG. 3F:

human actors 210, 212, 214, and 310 have respectively moved to areas 113, 145, 127, and 125;
human actors 216 and 218 both remained in area 133;
robotic actors 220, 224, 226, and 228 remain in respective areas 125, 146, 146, and 156;
robotic actor 222 is now between areas 142 and 143; and
robotic actor 230 is now in area 156.

Then, after designating areas 116, 117, 126, 127, 136, and 137 as high safety areas due to their presence in safety buffer 322, safety-system server 180 and/or other computing device(s) can additionally designate areas 113, 125, 133, and 145 as high safety areas due to the at least partial occupation of each of those areas by one or more human actors. Safety-system server 180 and/or other computing device(s) can also designate areas 142, 143, 146, and 156 as medium safety areas, as each of areas 142, 143, 146, and 156 was not otherwise designated and is at least partially occupied by one or more robotic actors. Additionally, safety-system server 180 and/or other computing device(s) can also designate areas 111, 112, 114, 115, 121-124, 131, 132, 134, 135, 141, 144, 147, 151-155, and 157 as low safety areas, as each of these areas does not include any actors.

Figure 3H:
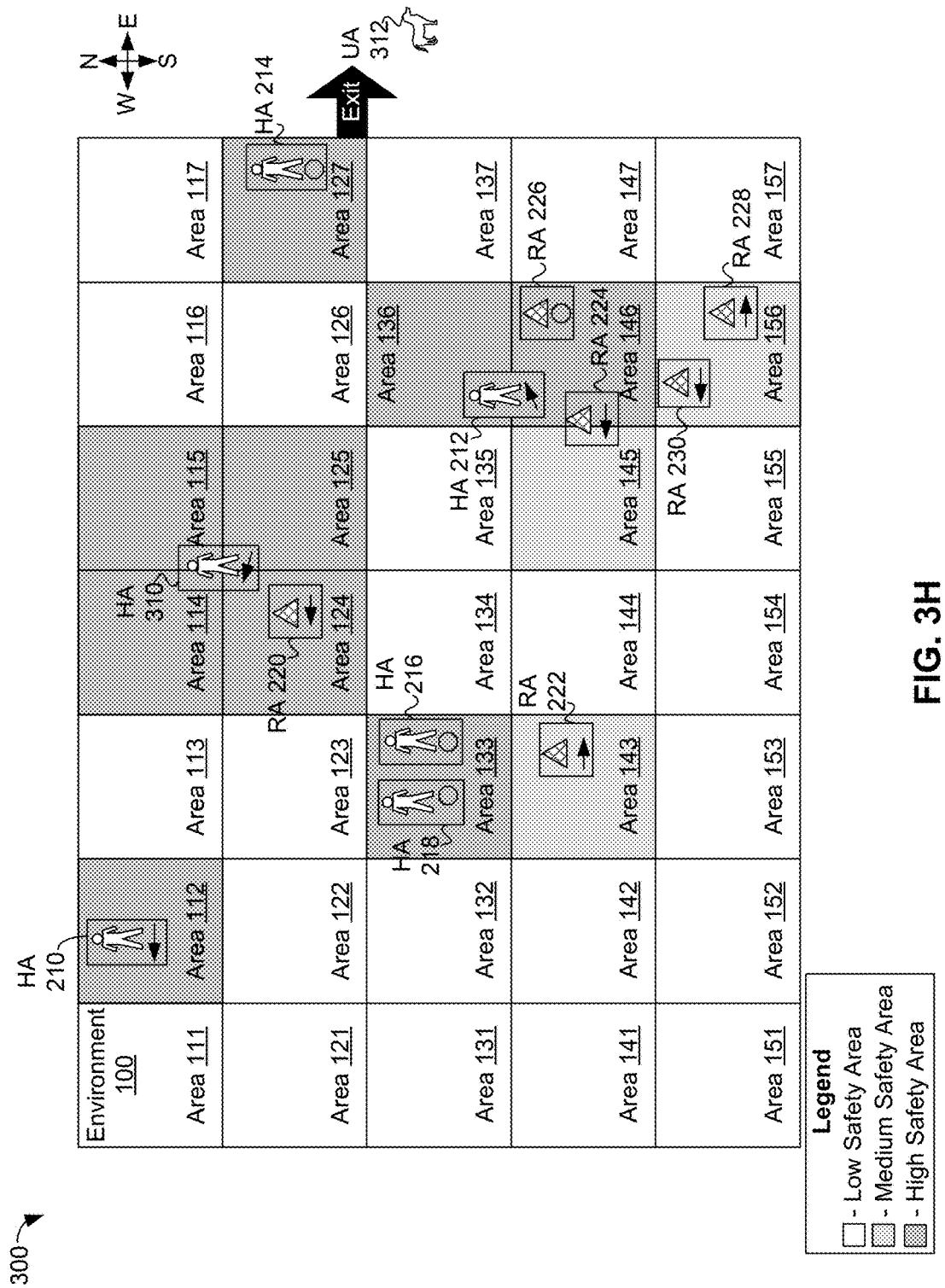

Scenario 300 continues with human actor 214 escorting unknown actor 312 out of environment 312 as shown in FIG. 3H. As such, safety-system server 180 and/or other computing device(s) can determine no unknown actors are inside environment 100, and so no safety buffers around unknown actors are to be utilized.

In addition, safety-system server 180 and/or other computing device(s) can use received presence/location and identification data to update safety information for environment 100 after determining that, with respect to the positions of the actors shown in FIG. 3G:

human actor 210 has moved to area 112;
human actor 212 is now between areas 136 and 146;
human actors 214, 216. and 218 have respectively remained in areas 127, 133, 133;
human actor 310 is at or near the intersection of areas 114, 115, 124, and 125
robotic actors 220, 224, 226, and 228 remain in respective areas 125, 146, 146, and 156;
robotic actor 222 is now between areas 142 and 143; and
robotic actor 230 is now in area 156.

As shown in FIG. 3H, safety-system server 180 and/or other computing device(s) can designate areas 112, 114, 115, 124, 125, 127, 133, 135, 136, and 146 as high safety areas due to the at least partial occupation of each of those areas by one or more human actors. Safety-system server 180 and/or other computing device(s) can also designate areas 143, 145, and 156 as medium safety areas, as each of areas 143, 145, and 156 was not otherwise designated and is at least partially occupied by one or more robotic actors. Additionally, safety-system server 180 and/or other computing device(s) can also designate areas 111, 113, 116, 117, 121-123, 126, 131, 132, 134, 135, 137, 141, 142, 144, 147, 151-155, and 157 as low safety areas, as each of these areas does not include any actors.

Figure 4:
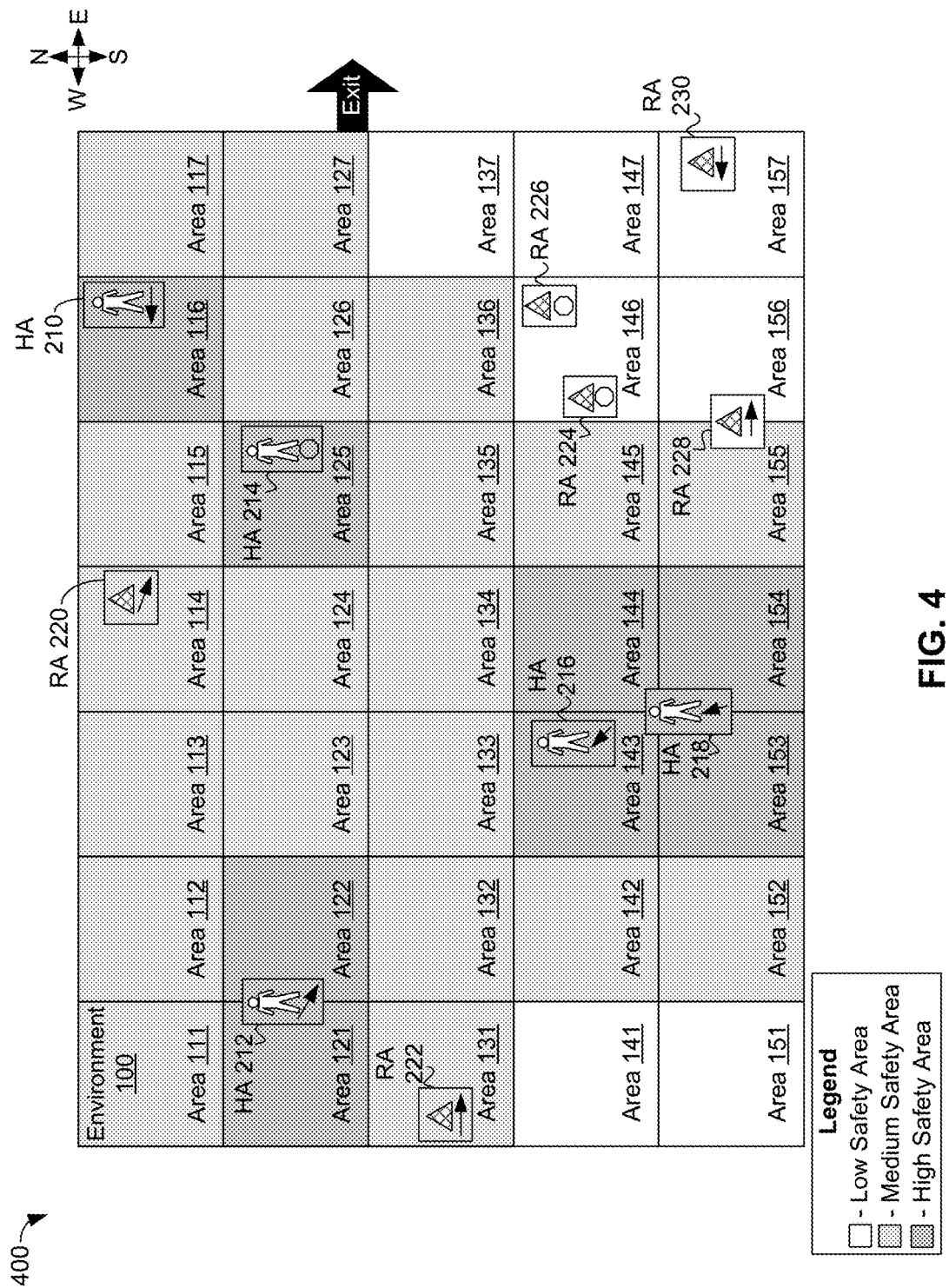
FIG. 4 shows another scenario involving the environment of FIG. 1, in accordance with an example embodiment.

FIG. 4 shows scenario 400 with safety areas specified for environment 100, in accordance with an example embodiment. Scenario 400 is related to scenario 200, but the determination of safety areas differs between the two scenarios.

In scenario 400, safety-system server 180 and/or other computing device(s) (e.g., a computing device aboard a robotic actor, a mobile device carried by a human actor) can receive presence/location and identification data for human actors 210, 212, 214, 216, 218 and robotic actors 220, 222, 224, 226, 228, 230. Then, safety-system server 180 and/or other computing device(s) can use received presence/location and identification data to determine that, for scenario 400:

human actors 210, 214, and 216 are in respective areas 116, 125, and 143 of environment 100;
human actor 212 is between areas 121 and 122;
human actor 218 is at or near the intersection point of areas 143, 144, 153, and 154;
robotic actors 220, 222, 224, 226, and 230 are in respective areas 114, 131, 146, 146, and 157; and
robotic actor 228 is between areas 155 and 156.

In scenario 400, the classification of high safety areas is the same as in scenario 200; that is, safety-system server 180 and/or other computing device(s) can determine that each of respective areas 116, 121, 122, 125, 143, 144, 153, and 154 is not already classified and is at least partially occupied by one or more human actors during scenario 400, and thus can be classified as high safety areas. High safety areas are shown in FIG. 4 using relatively-dark grey shading.

However, the classification of medium safety areas differs between scenarios 200 and 400. In scenario 400, safety-system server 180 and/or other computing device(s) can classify an area A as a medium safety area if area A has not already been classified and if area A is an area surrounding a high safety area. In scenario 400 and as shown in FIG. 4, safety-system server 180 and/or other computing device(s) can classify areas 111-115, 117, 123, 124, 126, 127, 131-136, 142, 145, 152, and 155 as medium safety areas. Medium safety areas are shown in FIG. 4 using relatively-light grey shading in comparison to the relatively-dark grey shading used for high safety areas. That is, in scenario 200, the presence of robotic actors played a role in classifying medium safety areas, while in scenario 400, medium safety areas act as safety buffers surrounding high safety areas (classified based on human presence alone), and thus, classification of medium safety areas in scenario 400 only depends on the presence/locations of human actors.

In some cases, areas 132 and 133 can be classified with higher safety values than areas 111, 112, 113, 123, and 131 as the areas 132 and 133 are areas that are within the surrounds of high safety areas for multiple human actors 212, 216, and 218, while areas 111, 112, 113, 123, and 131 are within the surrounds of only one human actor 212. In some cases, medium safety areas in the direction of travel of a human actor can be classified with higher safety values and/or medium safety areas in an opposite direction of the direction of travel of a human actor can be classified with lower safety values. For example, for human actor 210 in area 116 traveling west, medium safety area 115 (west of area 116) can be classified with a relatively-high safety value in comparison to medium safety area 117 (east of area 115).

In scenario 400, safety-system server 180 and/or other computing device(s) can classify an area A as a low safety area if area A was not previously classified as high or medium safety area. Thus, areas 137, 141, 146, 147, 151, 156, and 157 can be classified as low safety areas for scenario 400. Low safety areas are shown in FIG. 4 without shading.

Figure 5A:
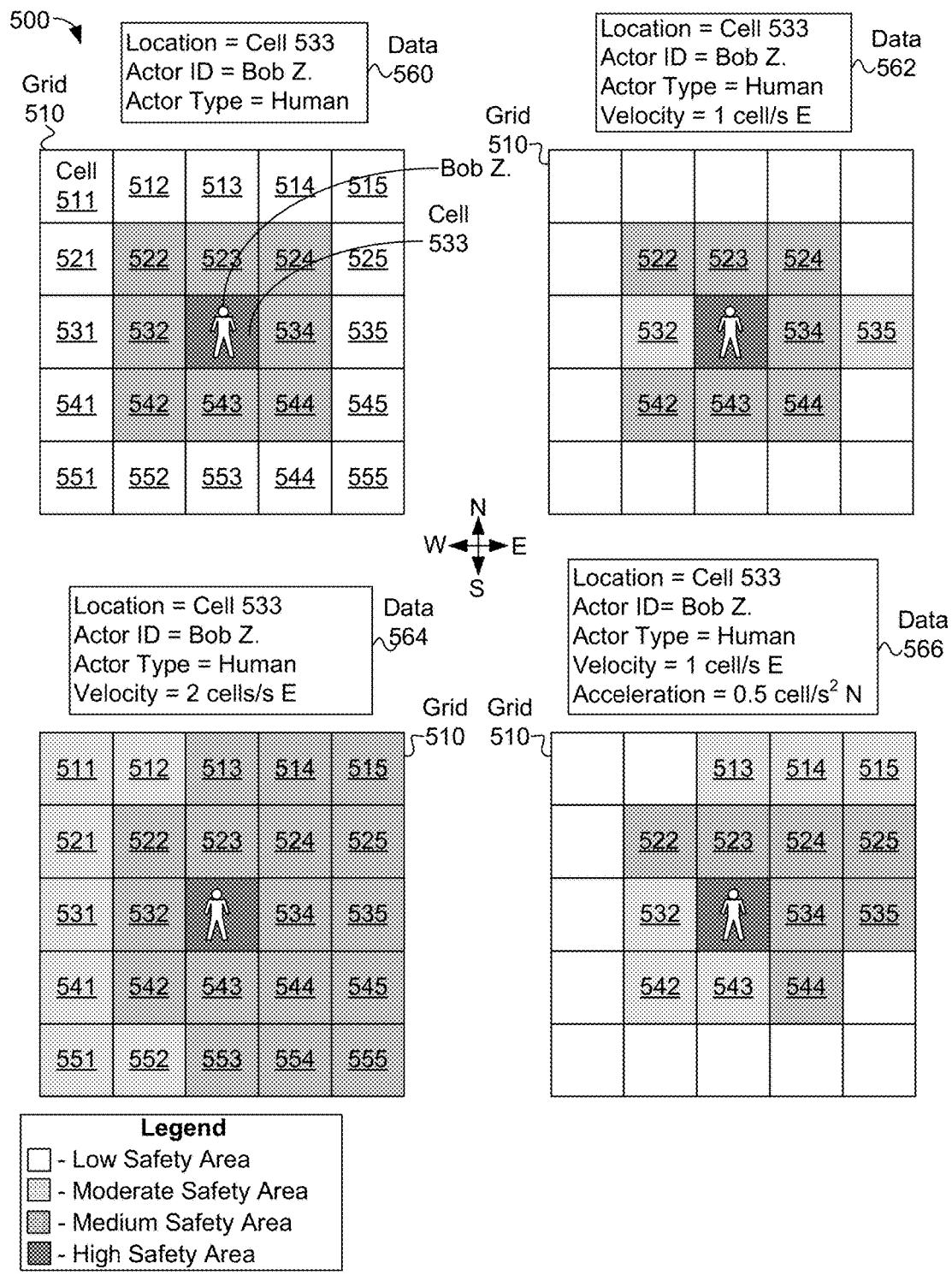
FIG. 5A shows example safety areas for human actors, in accordance with an example embodiment.

FIG. 5A shows example safety areas specified with respect to grid 510 for human actors, in accordance with an example embodiment. Grid 510 is a 5×5 grid of cells including a top row of cells 511, 512, 513, 514, 515, a second-from-top row of cells 521, 522, 523, 524, 525, a middle row of cells 531, 532, 533, 534, 535, a second-from-bottom row of cells 541, 542, 543, 544, 545, and a bottom row of cells 551, 552, 553, 554, 555. Each of the safety areas shown in FIG. 5A can be classified by one or more computing devices, such as safety-system server 180 and/or other computing device(s), operating on data, such as but not limited to data 560, 562, 564, and 566 as discussed below.

As shown in the upper left portion of FIG. 5A, a human actor "Bob Z." is located in cell 533 as specified in available data 560. Using data 560, cell 533 can be classified as a high safety area due to the presence of a human actor (Bob Z.) and cells surrounding cell 533; that is cells 522-524, 532, 534, and 542-544 can each be designated as medium safety areas. That is, the specification of cells 522-524, 532, 534, and 542-544 as medium safety areas can act as a safety buffer around human actor Bob Z. in cell 533. The remaining cells within grid 510; that is cells 511-515, 521, 525, 531, 535, 541, 545, and 551-555 can be classified as low safety areas.

A safety classification, a safety area and/or a safety buffer can depend on data about one or more actual, predicted, and/or instructed trajectories of human and/or robotic actors. Data about a trajectory of an actor can include, but is not limited to, a location of the actor, a velocity of an actor, a speed of an actor, a direction of travel of the actor, an acceleration of the actor, and/or instructions related to a trajectory for the actor. Examples of such instructions related to a trajectory include: an instruction to obtain an object located at cell 511, a command to go from cell 511 to cell 555 via cell 543, a request to be at cell 522 within 5 minutes, an order to stay in cell 533, etc.

As shown in the upper right portion of FIG. 5A, data 562 indicates that human actor Bob Z. is located at cell 533 and is moving with a velocity of 1 cell per second in an eastward direction, and so Bob Z. (likely) has an eastward trajectory. As such, the previously-discussed safety buffer around Bob Z. can be modified to designate cells 532 and 535 as moderate safety areas. A moderate safety area can be considered to be an area with fewer and/or less restrictive safety rules than the safety rules associated with a medium safety area, but with more and/or more restrictive safety rules than the safety rules associated with a low safety area. In comparison with the example safety buffer shown in at upper left of FIG. 5A, cell 532 can be classified as a moderate safety rule rather than a medium safety rule since cell 532 is directly opposite to a direction of travel (East) for human actor Bob Z., while cell 535 can be designated as a moderate safety rule rather than a low safety rule since cell 535 in the direction of travel for human actor Bob Z. The remaining cells within grid 510; that is cells 511-515, 521, 531, 535, 541, 545, and 551-555 can be classified as low safety areas.

In the lower left portion of FIG. 5A, data 564 indicates that human actor Bob Z. is located at cell 533 and is moving with a velocity of 2 cells per second in an eastward direction, and so Bob Z. (likely) has an eastward trajectory that is relatively rapid compared to the likely trajectory of Bob Z. indicated by data 562. As such, a safety buffer around Bob Z. can include all cells within 2 cells of Bob Z.'s current location (cell 533). As such, each cell in grid 510 shown at lower left of FIG. 5A is classified as at least a moderate safety area: cell 533 can be classified as a high safety area due to the presence of a human actor; cells 513-515, 522-525, 532, 534, 535, 542-545, and 553-555 can each be classified as a medium safety area as being at least somewhat likely that Bob Z. will travel through the cell based on Bob's Z's current location and velocity; and cells 511, 512, 521, 531, 541, 551, and 552 can each be classified as a moderate safety area as being at least possible that that Bob Z. travel through the cell based on Bob's Z's current location and velocity.

In the lower right portion of FIG. 5A, data 566 indicates that human actor Bob Z. is located at cell 533 and is moving with a velocity of 1 cell per second in an eastward direction and with an acceleration of 0.5 cells/second$^2$ in a northward direction, and so Bob Z. (likely) has an eastward or northeastward trajectory. As such, a safety buffer around Bob Z. can include all cells surrounding of Bob Z.'s current location (cell 533) as well as additional cells based on Bob Z's likely travel path. Cell 533 can be classified as a high safety cell due to Bob Z's presence. Regarding the cells surrounding cell 533, as Bob Z. is moving east and accelerating northward, cells to the north and/or east of cell 533 can be determined to be more likely to be traversed by Bob Z. than cells to the south and/or west of cell 532. As such, cells 522, 532, and 542 that are south and/or west of cell 533 can be classified as moderate safety cells, and cells 522, 524, 524, 534, and 544 can be classified as medium safety cells. Also, as Bob Z is accelerating, there is a possibility that Bob Z. will reach a cell that is north and/or east and 2 cells from Bob Z.'s current location in cell 533; thus, cells 513, 514, and 515 which are two cells north and zero or more cells east from cell 533, can be classified as moderate safety cells, while cells 525 and 535, which are two cells east and zero or more cells north of cell 533, can be classified as medium safety cells. The remaining cells within grid 510; that is cells 511, 512, 521, 531, 541, and 551-555 can be classified as low safety areas.

Figure 5B:
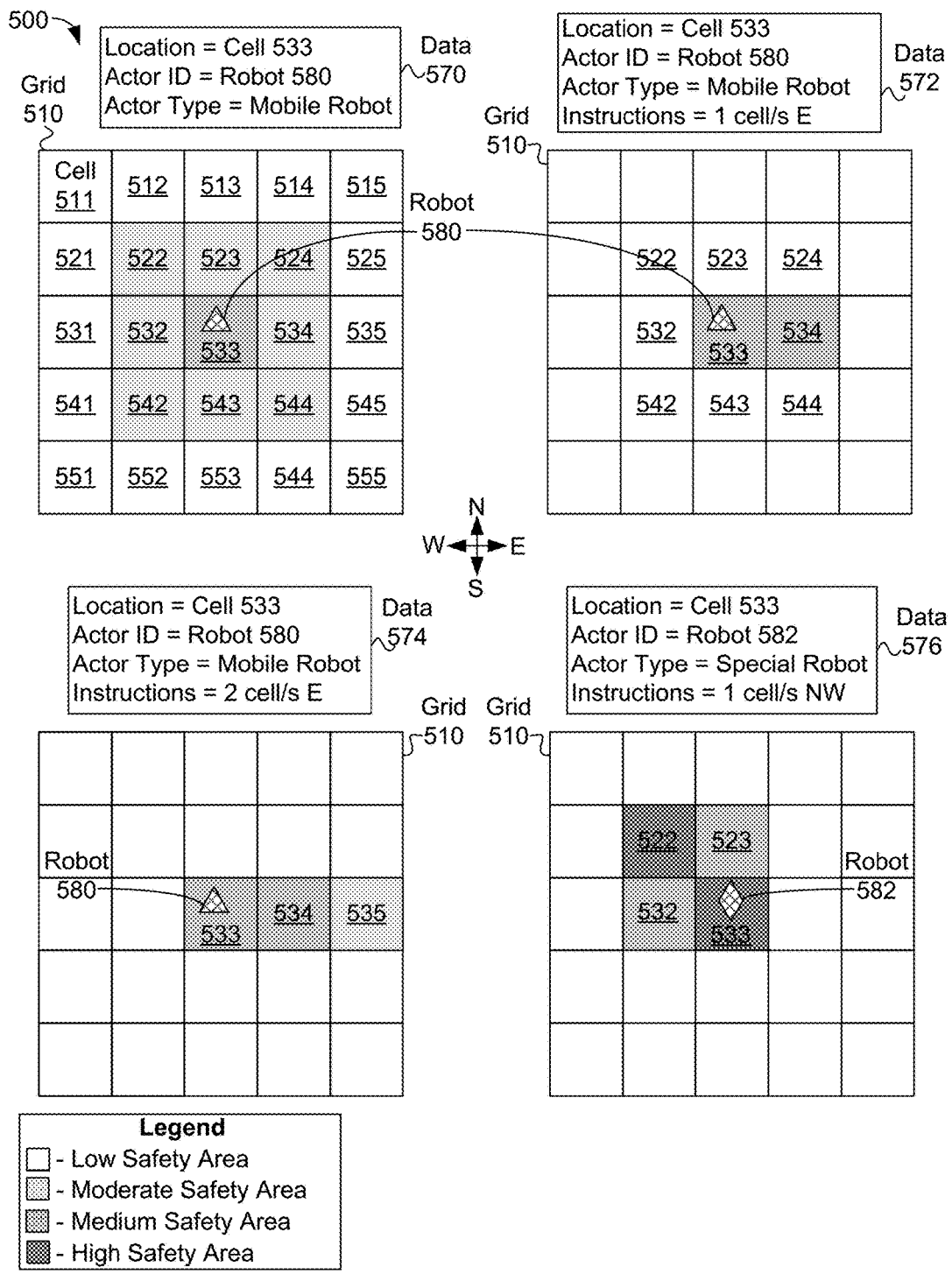
FIG. 5B shows example safety areas for robotic actors, in accordance with an example embodiment.

FIG. 5B shows example safety areas for robotic actors, in accordance with an example embodiment. Each of the safety areas shown in FIG. 5B can be classified by one or more computing devices, such as safety-system server 180 and/or other computing device(s), operating on data, such as but not limited to data 570, 572, 574, and 576 as discussed below. As shown in the upper left portion of FIG. 5B, robot 580 is located in cell 553 as specified in available data 570. Using data 570, cell 533 can be classified as a medium safety area due to the presence of a robotic actor (robot 580) and cells surrounding cell 533; that is cells 522-524, 532, 534, and 542-544 can each be designated as moderate safety areas. That is, the specification of cells 522-524, 532, 534, and 542-544 as moderate safety areas can act as a safety buffer around robot 580 in cell 533. The remaining cells within grid 510; that is cells 511-515, 521, 525, 531, 535, 541, 545, and 551-555 can be classified as low safety areas.

As shown in the upper right portion of FIG. 5B, data 572 indicates robot 580 is located at cell 533 and has been instructed to move at a velocity of 1 cell per second in an eastward direction, and so robot 580 (likely) has an eastward trajectory. As such, the previously-discussed safety buffer around robot 580 can be modified—based on information about where robot 580 will move; e.g., the "Location" and "Instructions" of data 572. The safety buffer around robot 580 can cover all cells within one cell (the instructed velocity of robot 580) in an eastward direction of robot 580's current location (cell 533). Cell 534 (one cell east of cell 533) can be classified as a safety buffer by indicating cell 534 is a medium safety area. In other embodiments, cell 534 can be classified as a moderate safety area, rather than a medium safety area. In still other embodiments, other cells can be designated as part of the safety buffer, perhaps as moderate safety areas,; e.g., cells 524 and 544 can be designated as part of the safety buffer as being in the general direction of travel of robot 580. The remaining cells within grid 510; that is cells 511-515, 521-525. 531, 532, 535, 541-545, and 551-555 can be classified as low safety areas.

In still other embodiments, data about actual velocity and/or acceleration of robot 580 can be used to determine a safety buffer about a robotic actor. That is, even though robot 580 is instructed to move east at 1 cell per second, the weight, velocity, acceleration, and/or other data about robot 580 may indicate that robot 580's actual trajectory will include to initial movement(s) in other direction(s) than the eastward direction specified in the "Instructions" of data, such as data 572. These movement(s) can take robot 580 through other cells in grid 510 than cells 533 and 534 before robot 580 moves eastward. Then, the one or more computing device classifying cells in grid 510 can predict which other cells robot 580 will traverse based on the weight, velocity, acceleration, and/or other data of robot 580, and add those other cells to the safety buffer, or perhaps use those other cells as the safety buffer rather than cell 534.

In the lower left portion of FIG. 5B, data 574 indicates robot 580 is located at cell 533 and has been instructed to move at a velocity of 2 cells per second in an eastward direction, and so robot 580 (likely) has an eastward trajectory that is relatively rapid compared to the likely trajectory of robot 580 indicated by data 572. As such, a safety buffer for robot 580 can be expanded to cover all cells within two cells in an eastward direction of robot 580's current location (cell 533). As such, cell 534 (one cell east of cell 533) can be classified as a medium safety area, as discussed above in the context of grid 510 and data 572, and cell 535 (two cells east of cell 533) can be classified as a moderate safety area. In some embodiments, other cells; e.g., cells that may be in robot 580's direction of travel, such as cells 511, 522, 523, 544, 545, and/or 555, can be added to the safety buffer as well. Cells not added to the safety buffer; e.g., cells 511-515, 521-525, 531, 532, 541-545, and 551-555, can be classified as low safety areas.

In the lower right portion of FIG. 5B, data 576 indicates that robot 582, shown using a diamond shape, is located in cell 533 and is instructed to move with a velocity of 1 cell per second in a north-westerly direction, and so robot 582 (likely) has an north-westward trajectory. Data 576 also indicates that robot 582 has a type of a "Special Robot"; in this example, a special robot is used to perform sensitive and/or dangerous tasks such as, but not limited to, carrying sensitive and/or dangerous payloads. As robot 582 is determined to be a Special Robot, cell 533 can be marked as a high safety area rather than a medium safety area used for a location of non-special robot 580.

In some embodiments, additional data, such as data about a task being performed by robot 582, can indicate a type of safety area applicable to a location of a robot; e.g., if robot 582 is carrying a dangerous payload, the location where robot 582 is located can be classified as a high safety area, while if robot 582 is traveling between task locations, then the location where robot 582 is located can be classified as a medium safety area. Additionally, the data about a task and/or type of robot can be used to classify cells as part of a safety buffer; e.g., the one or more computing devices can provide a relatively-large safety buffer for a robot performing a dangerous task or provide a relatively-small (or no) safety buffer for a robot performing an ordinary (non-dangerous) task.

In the example shown in FIG. 5B, robot 582 is instructed to travel northwest. A safety buffer around robot 582 can cover all cells within one cell (the instructed velocity of robot 582) in a northwesterly direction of robot 582's current location (cell 533). Cells 522 (one cell northwest of cell 533), 523 (one cell north of cell 533), and 532 (one cell west of cell 533) can be specified as part of a safety buffer; e.g., by indicating cell 522 is a high safety area, and indicating both cells 523 and 532 as medium safety areas as shown in at lower right of FIG. 5B. In other embodiments, cell 522 can be classified as a moderate or medium safety area, rather than as a high safety area. In even other embodiments, cells 523 and/or 532 can be classified as low safety areas (i.e., not part of the safety buffer), moderate safety areas, or high safety areas, rather than as medium safety areas. In still other embodiments, other cells can be designated as part of the safety buffer; e.g., cells 511, 512, 513, 521, and/or 531 can be designated as part of the safety buffer as being in the general direction of travel of robot 582. The remaining cells within grid 510; that is cells 511-515, 521, 524, 525. 531, 534, 535, 541-545, and 551-555 can be classified as low safety areas.

The one or more computing devices classifying cells of grid 510 for human and/or robotic actors can classify safety areas based upon available data, including actor-related data, location data, velocity data, and acceleration data. Other types of available data can affect classifications of safety areas. Other techniques for determining safety values and/or classifying areas in an environment, such as but not limited to environment 100 or grid 510, as safety areas are possible as well.

Computing Device Architecture

Figure 6A:
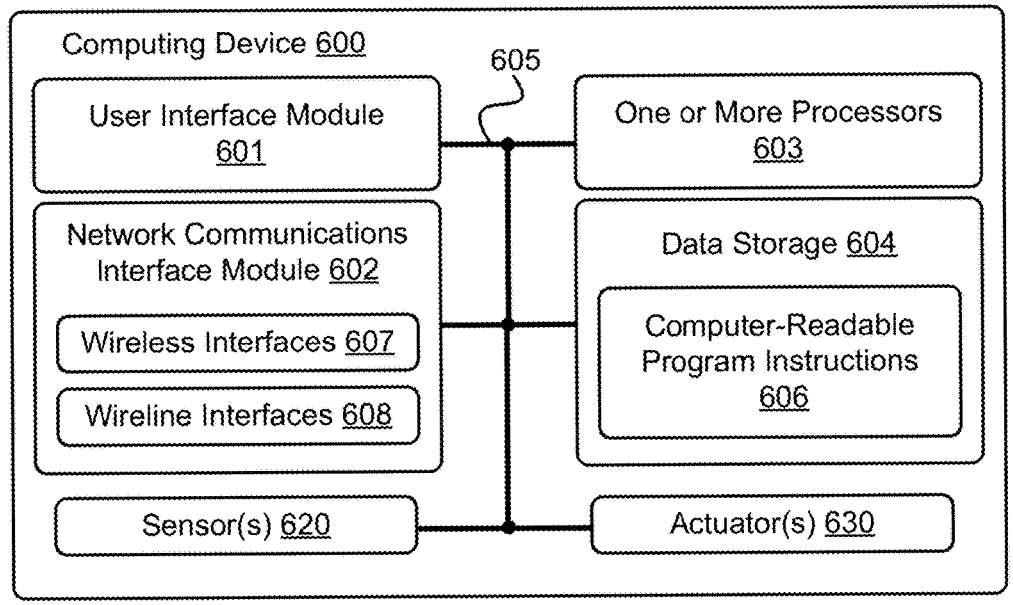
FIG. 6A is a functional block diagram of an example computing device, in accordance with an example embodiment.

FIG. 6A is a functional block diagram of computing device 600 (e.g., system, in accordance with an example embodiment. In particular, computing device 600 shown in FIG. 6A can be configured to perform one or more functions of a robot, robotic actor, a special robot, safety-system server 180, a computing device as discussed in the context of FIGS. 5A and 5B, network 614, method 700, and one or more functions related to one or more of scenarios 200, 300, and/or 400. Computing device 600 may include a user interface module 601, a network-communication interface module 602, one or more processors 603, data storage 604, one or more sensors 620, and one or more actuators 630, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a track ball, a joystick, a camera, a voice recognition module, and/or other similar devices. User interface module 601 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network. Wireless interfaces 607 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 603 can include one or more general purpose processors and/or one or more special purpose processors (e.g., digital signal processors, graphics processing units, application specific integrated circuits, etc.). Processors 603 can be configured to execute computer-readable program instructions 606 that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods and techniques and/or at least part of the functionality of the devices and networks.

In some embodiments, computing device 600 can include one or more sensors 620. Sensor(s) 620 can be configured to measure conditions in an environment for computing device 600 and provide data about that environment. In some examples, sensor(s) 620 can include one or more of: a gyroscope, an accelerometer, a Doppler sensor, a sonar sensor, a radar device, a laser-displacement sensor, and a compass, possibly to measure locations and/or movements of the computing device 600. In other examples, sensor(s) 620 can include one or more of: an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor, possibly to obtain data indicative of an environment of the computing device 600. In addition, sensor(s) 620 can include one or more sensors that measure forces acting about the computing device 600. For example, sensor(s) 620 can include one or more sensors that measure forces (e.g., inertial forces and/or G-forces) in multiple dimensions. Further, sensor(s) 620 can include one or more sensors that measure: torque, ground force, friction, and/or a zero moment point (ZMP) sensor that identifies ZMPs and/or locations of the ZMPs. Other examples of sensor(s) 620 are possible as well. In some embodiments, some or all of sensors 620 can be distributed throughout an environment; e.g., sensors 111s-157s dispersed throughout environment 100 such as discussed above at least in the context of FIG. 1.

Computing device 600 can include one or more actuators 630 that enable computing device 600 to initiate movement. For example, actuator(s) 630 can include or be incorporated with robotic joints connecting robotic limbs to a robotic body. For example, actuator(s) 630 can include respective robotic hip and robotic shoulder joints connecting respective robotic legs and arms to the robotic body. Further, the actuator(s) 630 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 630 can include respective robotic ankle joints connecting the robotic legs to robotic feet and respective robotic wrist joints connecting the robotic arms to robotic hands. In addition, actuator(s) 630 can include motors for moving the robotic limbs. As such, the actuator(s) 630 can enable mobility of computing device 600. Other examples of actuator(s) 630 are possible as well.

Cloud-Based Servers

Figure 6B:
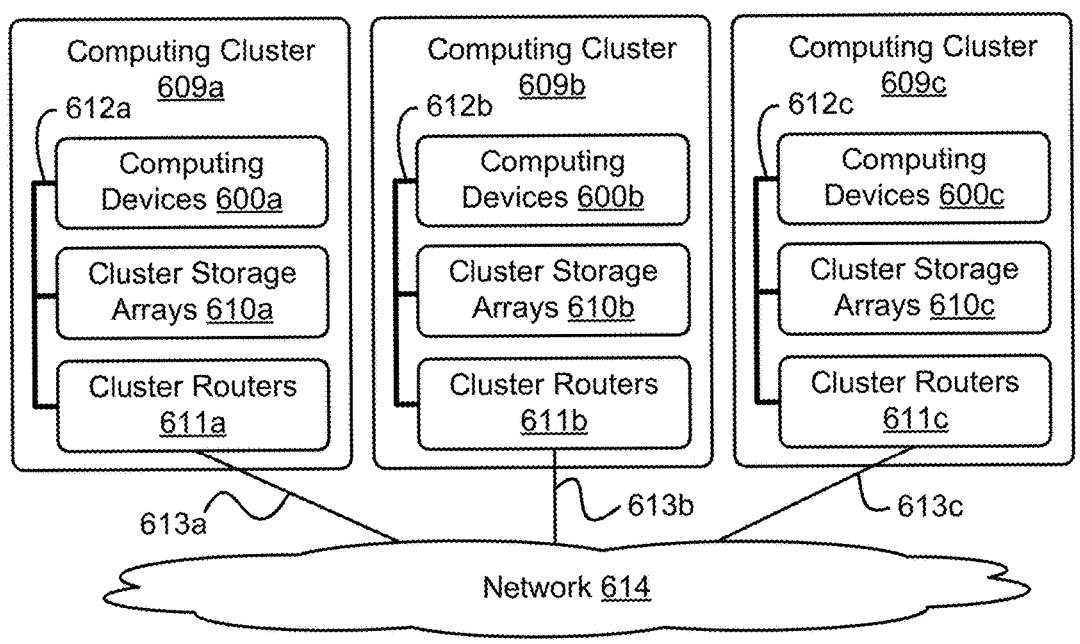
FIG. 6B depicts a cloud-based server system, in accordance with an example embodiment.

FIG. 6B depicts a network 614 of computing clusters 609a, 609b, 609c arranged as a cloud-based server system in accordance with an example embodiment. Computing clusters 609a, 609b, 609c can be cloud-based devices that store program logic and/or data of cloud-based applications and/or services; e.g., some or all of the herein-described functionality related to scenario 200, scenario 300, scenario 400, and/or method 700.

In some embodiments, computing clusters 609a, 609b, 609c can be a single computing device residing in a single computing center. In other embodiments, computing clusters 609a, 609b, 609c can include multiple computing devices in a single computing center, or even multiple computing devices located in multiple computing centers located in diverse geographic locations. For example, FIG. 6B depicts each of computing clusters 609a, 609b, 609c residing in different physical locations.

In some embodiments, data and services at computing clusters 609a, 609b, 609c can be encoded as computer readable information stored in non-transitory, tangible computer readable media (or computer readable storage media) and accessible by other computing devices. In some embodiments, computing clusters 609a, 609b, 609c can be stored on a single disk drive or other tangible storage media, or can be implemented on multiple disk drives or other tangible storage media located at one or more diverse geographic locations.

FIG. 6B depicts a cloud-based server system in accordance with an example embodiment. In FIG. 6B, functionality of a robot, safety-system server, robotic device, special robot, and/or robotic actor can be distributed among three computing clusters 609a, 609b, and 609c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of a robot, safety-system server, robotic device, special robot, and/or robotic actor. In one embodiment, the various functionalities of a robot, safety-system server, robotic device, special robot, and/or robotic actor can be distributed among one or more computing devices 600a, 600b, and 600c. Computing devices 600b and 600c in respective computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with a robot, safety-system server, robotic device, special robot, and/or robotic actor can be distributed across computing devices 600a, 600b, and 600c based at least in part on the processing requirements of a robot, safety-system server, robotic device, special robot, and/or robotic actor, the processing capabilities of computing devices 600a, 600b, and 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610a, 610b, and 610c of the computing clusters 609a, 609b, and 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a robot, safety-system server, robotic device, special robot, and/or robotic actor can be distributed across computing devices 600a, 600b, and 600c of computing clusters 609a, 609b, and 609c, various active portions and/or backup portions of these components can be distributed across cluster storage arrays 610a, 610b, and 610c. For example, some cluster storage arrays can be configured to store one portion of the data of a robot, safety-system server, robotic device, special robot, and/or robotic actor, while other cluster storage arrays can store other portion(s) of data of a robot, safety-system server, robotic device, special robot, and/or robotic actor. Additionally, some cluster storage arrays can be configured to store backup versions of data stored in other cluster storage arrays.

The cluster routers 611a, 611b, and 611c in computing clusters 609a, 609b, and 609c can include networking equipment configured to provide internal and external communications for the computing clusters. For example, the cluster routers 611a in computing cluster 609a can include one or more internet switching and routing devices configured to provide (i) local area network communications between the computing devices 600a and the cluster storage arrays 610a via the local cluster network 612a, and (ii) wide area network communications between the computing cluster 609a and the computing clusters 609b and 609c via the wide area network connection 613a to network 614. Cluster routers 611b and 611c can include network equipment similar to the cluster routers 611a, and cluster routers 611b and 611c can perform similar networking functions for computing clusters 609b and 609b that cluster routers 611a perform for computing cluster 609a.

In some embodiments, the configuration of the cluster routers 611a, 611b, and 611c can be based at least in part on the data communication requirements of the computing devices and cluster storage arrays, the data communications capabilities of the network equipment in the cluster routers 611a, 611b, and 611c, the latency and throughput of local networks 612a, 612b, 612c, the latency, throughput, and cost of wide area network links 613a, 613b, and 613c, and/or other factors that can contribute to the cost, speed, fault-tolerance, resiliency, efficiency and/or other design goals of the moderation system architecture.

Example Methods of Operation

FIG. 7 is a flowchart of method 700, in accordance with an example embodiment. Method 700 can be executed on a computing device. Example computing devices include, but are not limited to, computing device 600, a safety-system server such as safety-system server 180, a computing device aboard a herein-described robot, robotic actor, robotic device, special robot, and/or other computing device(s). In some embodiments, the computing device can be part of a safety system, such as discussed above in the context of at least FIG. 1.

Method 700 can begin at block 710, where the computing device can determine presence information and actor type information about any actors present within a predetermined area of an environment using one or more sensors, such as discussed above regarding as least FIGS. 1-4.

In some embodiments, the one or more sensors can include two or more sensors for determining the presence information, such as discussed above regarding at least FIG. 1. In other embodiments, where the one or more sensors include two or more sensors for determining the actor type information, such as discussed above regarding at least FIG. 1. In even other embodiments, a size of the predetermined area can be based on a range of the one or more sensors, such as discussed above regarding at least FIG. 1.

In other embodiments, such as embodiments where the computing device is part of a safety system, the safety system can also include the one or more sensors; and the one or more sensors can be distributed throughout the environment, such as discussed above regarding at least FIG. 1. In particular of these embodiments, the environment can be divided into a plurality of areas that comprise the predetermined area. Then, the one or more sensors can include a first sensor having a first range and a second sensor having a second range. Additionally, a first area of the plurality of areas can be associated with the first sensor and can have a size that is based on the first range, and the predetermined area can be associated with the second sensor and can have a size that is based on the second range, such as discussed above regarding at least FIG. 1.

In still other embodiments, the one or more sensors can include an RFID sensor configured to provide at least part of the actor type information, such as discussed above regarding at least FIG. 1. In particular of these embodiments, each of the one or more actors can be provided with an RFID device then, the RFID sensor can be configured to obtain at least part of the actor type information from the RFID device, such as discussed above regarding at least FIG. 1.

In even other embodiments, the one or more sensors can include a sensor configured to detect one or more patterns of light, such as discussed above regarding at least FIG. 1. Then, at least one actor of the one or more actors can be provided with a light source configured to emit a pattern of light, where the pattern of light conveys at least part of the actor type information, such as discussed above regarding at least FIG. 1.

In yet other embodiments, the one or more sensors can include a sensor configured to detect one or more patterns of sound, such as discussed above regarding at least FIG. 1. Then, at least one actor of the one or more actors can be provided with a sound generator configured to emit one or more sounds, where the one or more sounds convey at least part of the actor type information, such as discussed above regarding at least FIG. 1.

At block 720, the computing device can determine a particular safety classification of the predetermined area based on the presence and actor type information using the computing device. The particular safety classification can include: a low safety classification if the presence and actor type information indicates zero actors are present within the predetermined area, a medium safety classification if the presence and actor type information indicates one or more actors are present within the predetermined area and that all of the one or more actors are of a predetermined first type, and a high safety classification if the presence and actor type information indicates one or more actors are present within the predetermined area and that at least one actor of the one or more actors is of a predetermined second type, such as discussed above regarding at least FIGS. 2-3H.

At block 730, the computing device can, after determining the particular safety classification for the predetermined area, provide a safety rule for operating within the predetermined area to a robotic device operating in the environment, where the safety rule can correspond to the particular safety classification, such as discussed above regarding at least FIGS. 1-4.

In some embodiments, the safety rule can include: a low safety rule corresponding to the low safety classification, a medium safety rule corresponding to the medium safety classification, and a high safety rule corresponding to the high safety classification, such as discussed above regarding at least FIGS. 1-4. In other embodiments, the low safety rule can relate to fewer safety-related provisions of the robotic device than the medium safety rule, and the medium safety rule can relate to fewer safety-related provisions of the robotic device than the high safety rule, such as discussed above regarding at least FIGS. 1-5B. In still other embodiments, the robotic device includes a local safety system. Then, at least one of the low safety rule, the medium safety rule, and the high safety rule include a rule related to the local safety system, such as discussed above regarding at least FIG. 1. In even other embodiments, at least one of the low safety rule, the medium safety rule, and the high safety rule include a rule related to a maximum speed of the robotic device, such as discussed above regarding at least FIG. 1.

In yet other embodiments, the environment can be divided into a plurality of areas that include the predetermined area. Then, the safety rule for operating within the predetermined area can include a safety rule for operating in multiple areas of the plurality of areas, and wherein the multiple areas comprise the predetermined area, such as discussed above regarding at least FIG. 1. In particular of these embodiments, the one or more sensors can include a first sensor having a first range and a second sensor having a second range. Then, a first area of the plurality of areas can be associated with the first sensor and can have a size that is based on the first range. Also, the predetermined area can be associated with the second sensor and can have a size that is based on the second range, such as discussed above regarding at least FIG. 1.

In yet even other embodiments, the type of the actor can be selected from at least the first type, the second type, and a third type, and where the third type can differ from both the first type and the second type, such as discussed above regarding at least FIGS. 3A-3H. In particular of these embodiments, the first type can relate to a robotic actor, where the second type can relate to a human actor, and the third type can relate to an unknown type of actor, such as discussed above regarding at least FIGS. 3A-3H. In more particular embodiments, method 700 can further include: after determining that the type of the actor is the unknown type, the computing device providing an emergency safety rule to stop the robotic device, such as discussed above regarding at least FIGS. 3C-3E.

In still other embodiments, the environment is divided into a plurality of areas that include the predetermined area. Then, determining the presence information and the actor type information within the predetermined area of the environment can include: receiving global information about the plurality of areas, where the global information includes presence information and the actor type information within the predetermined area of the environment. In these embodiments, method 700 can further include dynamically changing safety classifications for at least one area of the plurality of areas within the environment based on the global information.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
    determining presence information and actor type information about any actors present within a predetermined area of an environment using one or more sensors associated with a computing device;
    determining a particular safety classification of the predetermined area based on at least the presence and actor type information using the computing device, wherein the particular safety classification comprises:
        a low safety classification if the presence and actor type information indicates zero actors are present within the predetermined area,
        a medium safety classification if the presence and actor type information indicates one or more actors are present within the predetermined area and that all of the one or more actors are of a predetermined first type, and a high safety classification if the presence and actor type information indicates one or more actors are present within the predetermined area and that at least one actor of the one or more actors is of a predetermined second type; and after determining the particular safety classification for the predetermined area, the computing device providing a safety rule for operating within the predetermined area to a robotic device operating in the environment, wherein the safety rule corresponds to the particular safety classifications;

wherein the type of the actor is selected from at least the first type, the second type, and a third type, wherein the third type differs from both the first type and the second type, wherein the first type relates to a robotic actor, wherein the second type relates to a human actor, and wherein the third type relates to an unknown type of actor.

2. The method of claim 1, wherein the safety rule is at least one of:
a low safety rule corresponding to the low safety classification,
a medium safety rule corresponding to the medium safety classification, and
a high safety rule corresponding to the high safety classification.

3. The method of claim 2, wherein the low safety rule relates to fewer safety-related provisions of the robotic device than the medium safety rule, and wherein the medium safety rule relates to fewer safety-related provisions of the robotic device than the high safety rule.

4. The method of claim 1, wherein the robotic device comprises a local safety system, and wherein at least one of the low safety rule, the medium safety rule, and the high safety rule comprises a rule related to the local safety system.

5. The method of claim 1, wherein at least one of the low safety rule, the medium safety rule, and the high safety rule comprises a rule related to a maximum speed of the robotic device.

6. The method of claim 1, wherein determining the particular safety classification of the predetermined area based on at least the presence and actor type information comprises determining the particular safety classification of the predetermined area based on data related to a trajectory of an actor.

7. The method of claim 1, wherein the environment is divided into a plurality of areas that comprise the predetermined area, and wherein the safety rule for operating within the predetermined area comprises a safety rule for operating in multiple areas of the plurality of areas, and wherein the multiple areas comprise the predetermined area.

8. The method of claim 7, wherein the one or more sensors comprise a first sensor having a first range and a second sensor having a second range, wherein a first area of the plurality of areas is associated with the first sensor and has a size that is based on the first range, and wherein the predetermined area is associated with the second sensor and has a size that is based on the second range.

9. The method of claim 1, wherein the environment is divided into a plurality of areas that comprise the predetermined area, and wherein determining the presence information and the actor type information within the predetermined area of the environment comprises:
receiving global information about the plurality of areas, wherein the global information comprises the presence information and the actor type information within the predetermined area of the environment; and wherein the method further comprises:
dynamically changing safety classifications for at least one area of the plurality of areas within the environment based on the global information.

10. The method of claim 9, further comprising:
after determining that the type of the actor is the unknown type, the computing device providing an emergency safety rule to stop the robotic device.

11. A safety system, comprising:
a computing device, comprising:
one or more processors; and
data storage including at least computer-executable instructions stored thereon that, when executed by the one or more processors, cause the computing device to perform functions comprising:
determining presence information and actor type information about any actors present within a predetermined area of an environment using one or more sensors, wherein the environment is divided into a plurality of areas that comprise the predetermined area, wherein the one or more sensors comprise a first sensor having a first range and a second sensor having a second range, wherein a first area of the plurality of areas is associated with the first sensor and has a size that is based on the first range, and wherein the predetermined area is associated with the second sensor and has a size that is based on the second range;
determining a particular safety classification of the predetermined area based on the presence and actor type information, wherein the particular safety classification comprises:
a low safety classification if the presence and actor type information indicates zero actors are present within the predetermined area,
a medium safety classification if the presence and actor type information indicates one or more actors are present within the predetermined area and that all of the one or more actors are of a predetermined first type, and
a high safety classification if the presence and actor type information indicates one or more actors are present within the predetermined area and that at least one actor of the one or more actors is of a predetermined second type; and
after determining the particular safety classification for the predetermined area, providing a safety rule for operating within the predetermined area to a robotic device operating in the environment, wherein the safety rule corresponds to the particular safety classification.

12. The safety system of claim 11, wherein the safety rule is at least one of:
a low safety rule corresponding to the low safety classification,
a medium safety rule corresponding to the medium safety classification, and
a high safety rule corresponding to the high safety classification,
wherein the low safety rule relates to fewer safety-related provisions of the robotic device than the medium safety rule, and wherein the medium safety rule relates to fewer safety-related provisions of the robotic device than the high safety rule.

13. The safety system of claim 12, wherein the robotic device comprises a local safety system, and wherein at least one of the low safety rule, the medium safety rule, and the high safety rule comprises a rule related to the local safety system.

14. The safety system of claim 11, further comprising the one or more sensors, wherein the one or more sensors are distributed throughout the environment.

15. The safety system of claim 11, wherein the first sensor comprises a Radio Frequency Identification (RFID) sensor configured to provide at least part of the actor type information, wherein each of the one or more actors is provided with an RFID device, and wherein the RFID sensor is configured to obtain at least part of the actor type information from the RFID device.

16. The safety system of claim 11 wherein the first sensor comprises a sensor configured to detect one or more patterns of light, wherein at least one actor of the one or more actors is provided with a light source configured to emit a pattern of light, and wherein the pattern of light conveys at least part of the actor type information.

17. The safety system of claim 11, wherein the environment is divided into a plurality of areas that comprise the predetermined area, and wherein determining the presence information and the actor type information within the predetermined area of the environment comprises:
receiving global information about the plurality of areas, wherein the global information comprises the presence information and the actor type information within the predetermined area of the environment; and
wherein the functions further comprise:
dynamically changing safety classifications for at least one area of the plurality of areas within the environment based on the global information.

18. A method, comprising:
determining presence information and actor type information about any actors present within a predetermined area of an environment using one or more sensors associated with a computing device, wherein the environment is divided into a plurality of areas that comprise the predetermined area;
determining a particular safety classification of the predetermined area based on at least the presence and actor type information using the computing device, wherein the particular safety classification comprises:
a low safety classification if the presence and actor type information indicates zero actors are present within the predetermined area,
a medium safety classification if the presence and actor type information indicates one or more actors are present within the predetermined area and that all of the one or more actors are of a predetermined first type, and
a high safety classification if the presence and actor type information indicates one or more actors are present within the predetermined area and that at least one actor of the one or more actors is of a predetermined second type; and
after determining the particular safety classification for the predetermined area, the computing device providing a safety rule for operating within the predetermined area to a robotic device operating in the environment, wherein the safety rule corresponds to the particular safety classification, and wherein the safety rule for operating within the predetermined area comprises a safety rule for operating in multiple areas of the plurality of areas which comprise the predetermined area.

19. A safety system, comprising:
a computing device, comprising:
one or more processors; and
data storage including at least computer-executable instructions stored thereon that, when executed by the one or more processors, cause the computing device to perform functions comprising:
determining presence information and actor type information about any actors present within a predetermined area of an environment using one or more sensors, wherein the one or more sensors comprise one or both of:
a Radio Frequency Identification (RFID) sensor configured to provide at least part of the actor type information, wherein at least one of the one or more actors is provided with an RFID device, and wherein the RFID sensor is configured to obtain at least part of the actor type information from the RFID device, and
a sensor configured to detect one or more patterns of light, wherein at least one actor of the one or more actors is provided with a light source configured to emit a pattern of light, and wherein the pattern of light conveys at least part of the actor type information;
determining a particular safety classification of the predetermined area based on the presence and actor type information, wherein the particular safety classification comprises:
a low safety classification if the presence and actor type information indicates zero actors are present within the predetermined area,
a medium safety classification if the presence and actor type information indicates one or more actors are present within the predetermined area and that all of the one or more actors are of a predetermined first type, and
a high safety classification if the presence and actor type information indicates one or more actors are present within the predetermined area and that at least one actor of the one or more actors is of a predetermined second type; and
after determining the particular safety classification for the predetermined area, providing a safety rule for operating within the predetermined area to a robotic device operating in the environment, wherein the safety rule corresponds to the particular safety classification.

20. The system of claim 19, wherein the one or more sensors comprise the Radio Frequency Identification (RFID) sensor configured to provide at least part of the actor type information, and wherein each of the one or more actors is provided with the RFID device.

21. The system of claim 19, wherein the one or more sensors comprise the sensor configured to detect one or more patterns of light, and wherein at least one actor of the one or more actors is provided with the light source configured to emit the pattern of light.

22. A safety system, comprising:
a computing device, comprising:
one or more processors; and
data storage including at least computer-executable instructions stored thereon that, when executed by the one or more processors, cause the computing device to perform functions comprising:
determining presence information and actor type information about any actors present within a predetermined area of an environment using one or more sensors, wherein the environment is divided into a plurality of areas that comprise the predetermined area, and wherein determining the presence information and the actor type information within the predetermined area of the environment comprises:
  receiving global information about the plurality of areas, wherein the global information comprises the presence information and the actor type information within the predetermined area of the environment;
determining a particular safety classification of the predetermined area based on the presence and actor type information, wherein the particular safety classification comprises:
  a low safety classification if the presence and actor type information indicates zero actors are present within the predetermined area,
  a medium safety classification if the presence and actor type information indicates one or more actors are present within the predetermined area and that all of the one or more actors are of a predetermined first type, and
  a high safety classification if the presence and actor type information indicates one or more actors are present within the predetermined area and that at least one actor of the one or more actors is of a predetermined second type;
after determining the particular safety classification for the predetermined area, providing a safety rule for operating within the predetermined area to a robotic device operating in the environment, wherein the safety rule corresponds to the particular safety classification; and
dynamically changing safety classifications for at least one area of the plurality of areas within the environment based on the global information.

* * * * *